United States Patent
Norton et al.

(10) Patent No.: US 11,709,125 B2
(45) Date of Patent: Jul. 25, 2023

(54) STROBED LASER EXCITATION SYSTEMS AND METHODS OF USE THEREOF

(71) Applicant: Becton, Dickinson and Company, Franklin Lakes, NJ (US)

(72) Inventors: Pierce O. Norton, Los Gatos, CA (US); Geoffrey Osborne, Los Gatos, CA (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 221 days.

(21) Appl. No.: 17/163,870

(22) Filed: Feb. 1, 2021

(65) Prior Publication Data

US 2021/0255089 A1   Aug. 19, 2021

Related U.S. Application Data

(60) Provisional application No. 62/978,751, filed on Feb. 19, 2020.

(51) Int. Cl.
*G01N 15/14* (2006.01)
*G01N 21/64* (2006.01)
*G01N 15/00* (2006.01)

(52) U.S. Cl.
CPC ..... *G01N 15/1434* (2013.01); *G01N 15/1425* (2013.01); *G01N 15/1459* (2013.01);
(Continued)

(58) Field of Classification Search
CPC ........... G01N 15/1425; G01N 15/1434; G01N 15/1459; G01N 2015/0065;
(Continued)

(56) References Cited

U.S. PATENT DOCUMENTS 3,916,197 A * 10/1975 Fulwyler ................ C12M 41/46
 250/361 R
5,365,559 A    11/1994 Hsueh
(Continued)

FOREIGN PATENT DOCUMENTS

EP           242445 A2    10/1987
EP       0950890 B1 * 10/1999 ............. G01N 15/14
(Continued)

OTHER PUBLICATIONS

U.S. Appl. No. 62/865,107, filed Jun. 21, 2019 and published Dec. 24, 2020 as part of the publicaiton of U.S. Appl. No. 16/908,638. Said Provisional Application was presented as the Appendix to the specficaiton of said Non-Provisional Application.

*Primary Examiner* — Dominic J Bologna
(74) *Attorney, Agent, or Firm* — Peter W. Schroen; Bret E. Field.; Bozicevic, Field & Francis LLP

(57) ABSTRACT

Aspects of the present disclosure include systems for irradiating particles in a flow stream. Systems according to certain embodiments include a light source having a first laser configured for continuous irradiation of a flow stream and a second laser configured for irradiation of the flow stream in discrete intervals where each discrete interval of irradiation by the second laser is triggered by irradiation of a particle in the flow stream with the first laser. Methods for irradiating a sample in a flow stream with the subject light sources are also described. Computer readable storage medium for practicing the subject methods are provided. Kits having one or more lasers are also provided.

20 Claims, 12 Drawing Sheets

(52) U.S. Cl.
CPC . *G01N 21/6408* (2013.01); *G01N 2015/0065* (2013.01); *G01N 2015/1438* (2013.01)

(58) Field of Classification Search
CPC ... G01N 2015/1006; G01N 2015/1438; G01N 2015/149; G01N 2021/6415; G01N 2021/6419; G01N 2021/6421; G01N 21/53; G01N 21/532; G01N 21/64; G01N 21/6408
See application file for complete search history.

(56) References Cited

U.S. PATENT DOCUMENTS

| | | | | |
|---|---|---|---|---|
| 5,760,900 | A * | 6/1998 | Ito | G01N 15/1434 356/73 |
| 6,139,800 | A * | 10/2000 | Chandler | G01N 15/1456 422/82.08 |
| 7,061,595 | B2 * | 6/2006 | Cabuz | A61B 5/150213 137/487.5 |
| 8,467,040 | B2 * | 6/2013 | Luscher | C12M 47/04 356/342 |
| 8,570,500 | B2 * | 10/2013 | Javadi | G01N 15/1434 356/73 |
| 9,952,136 | B2 * | 4/2018 | Javadi | G01N 15/1434 |
| 2005/0106739 | A1 * | 5/2005 | Cabuz | A61B 5/150343 436/63 |
| 2008/0213915 | A1 | 9/2008 | Durack et al. | |
| 2010/0220315 | A1 * | 9/2010 | Morrell | G01N 15/1436 356/73 |
| 2011/0085221 | A1 * | 4/2011 | Ortyn | G02B 26/0858 359/305 |
| 2015/0077869 | A1 * | 3/2015 | Meng | G02B 27/0966 359/837 |
| 2016/0169787 | A1 * | 6/2016 | Crow | G01N 15/1434 356/138 |
| 2018/0364145 | A1 | 12/2018 | Rich | |
| 2019/0094123 | A1 * | 3/2019 | Cao | G01N 15/1434 |
| 2019/0113435 | A1 * | 4/2019 | Cao | G01N 33/4915 |
| 2021/0055201 | A1 * | 2/2021 | Cooksey | G01N 15/1404 |
| 2022/0146401 | A1 * | 5/2022 | Yamamoto | G01N 15/1429 |

FOREIGN PATENT DOCUMENTS

| | | | |
|---|---|---|---|
| EP | 2724145 B1 | 10/2019 | |
| JP | 2006220954 A | * 8/2006 | |
| WO | WO-2013173446 A1 | * 11/2013 | G01N 15/14 |

* cited by examiner

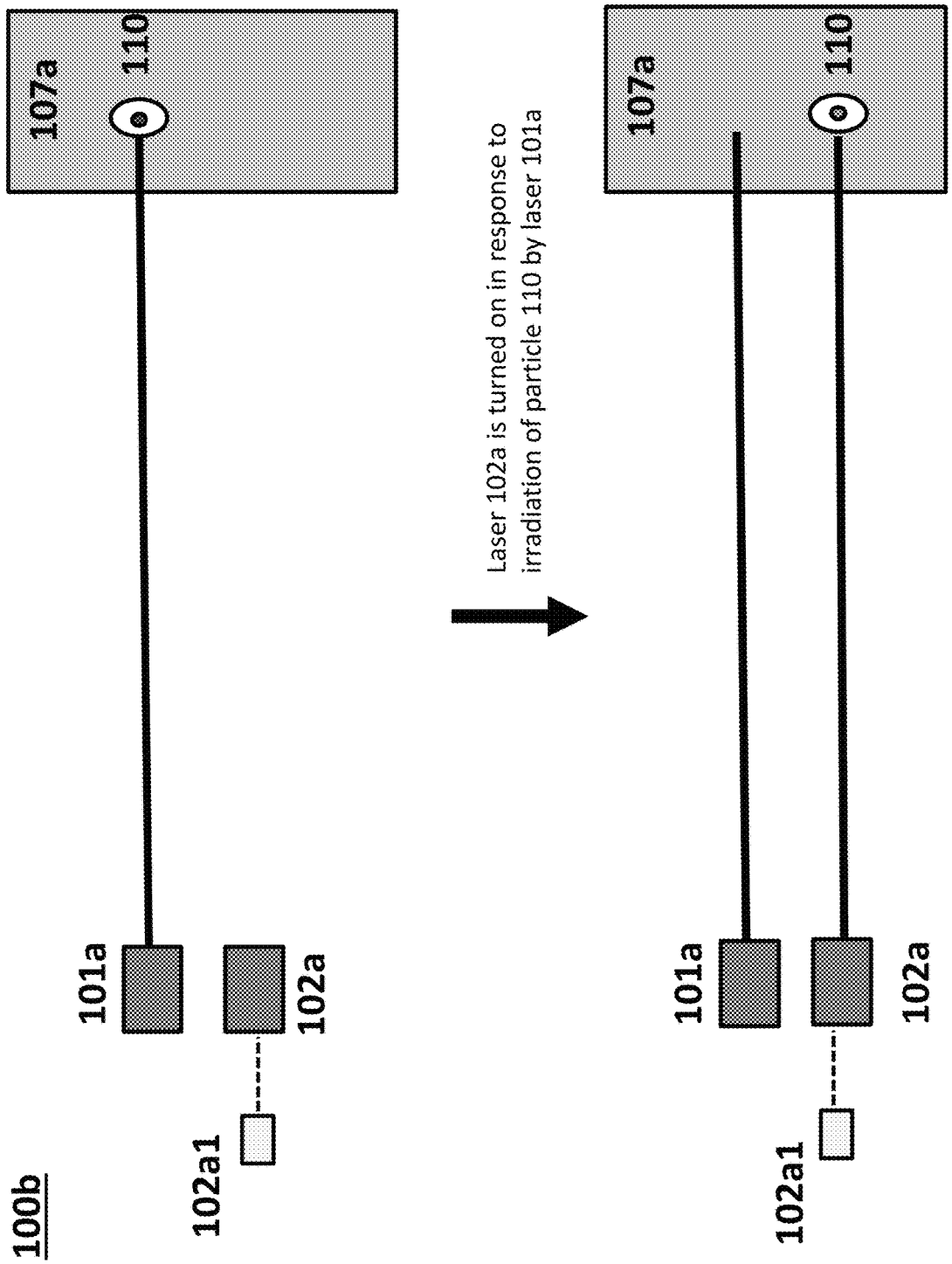

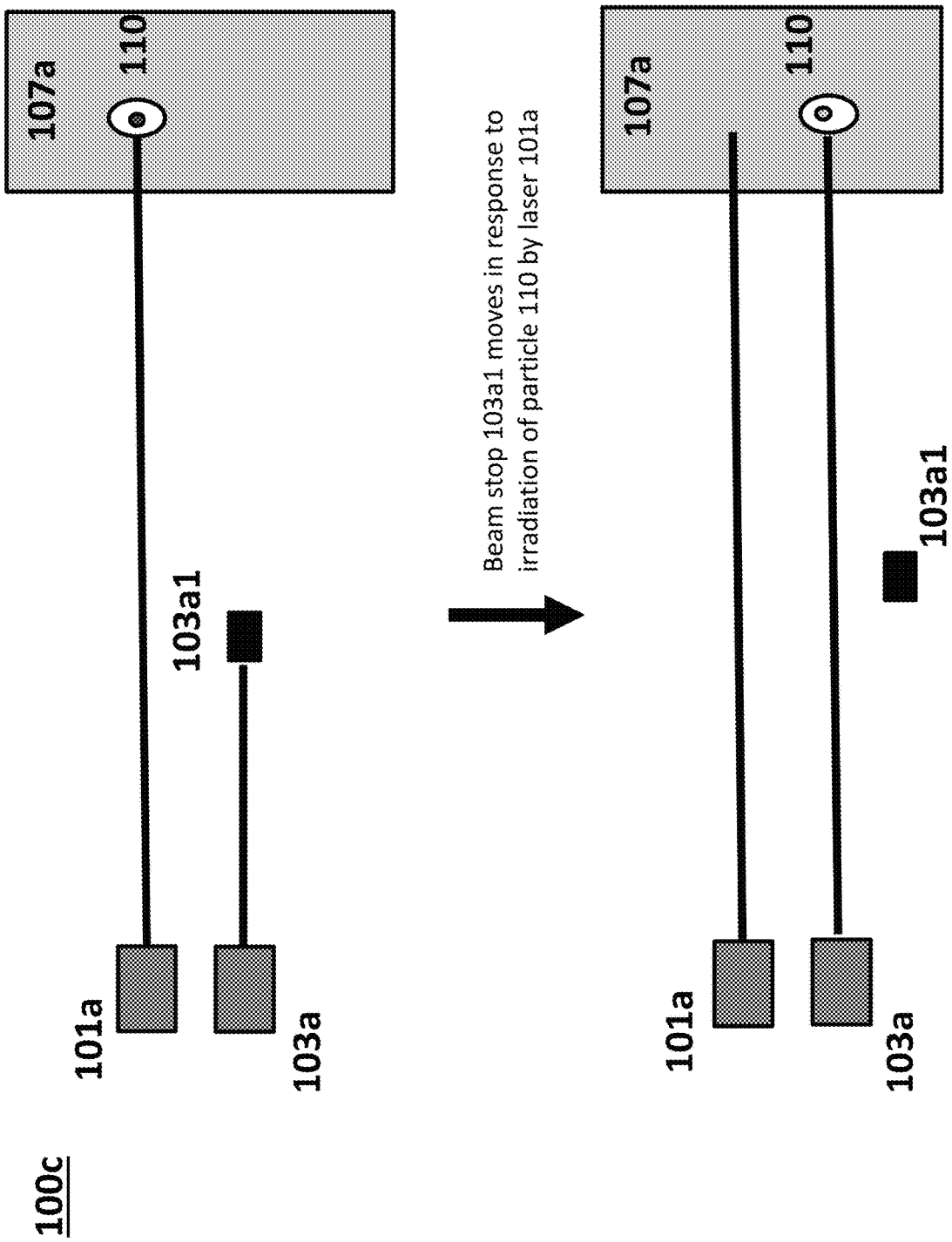

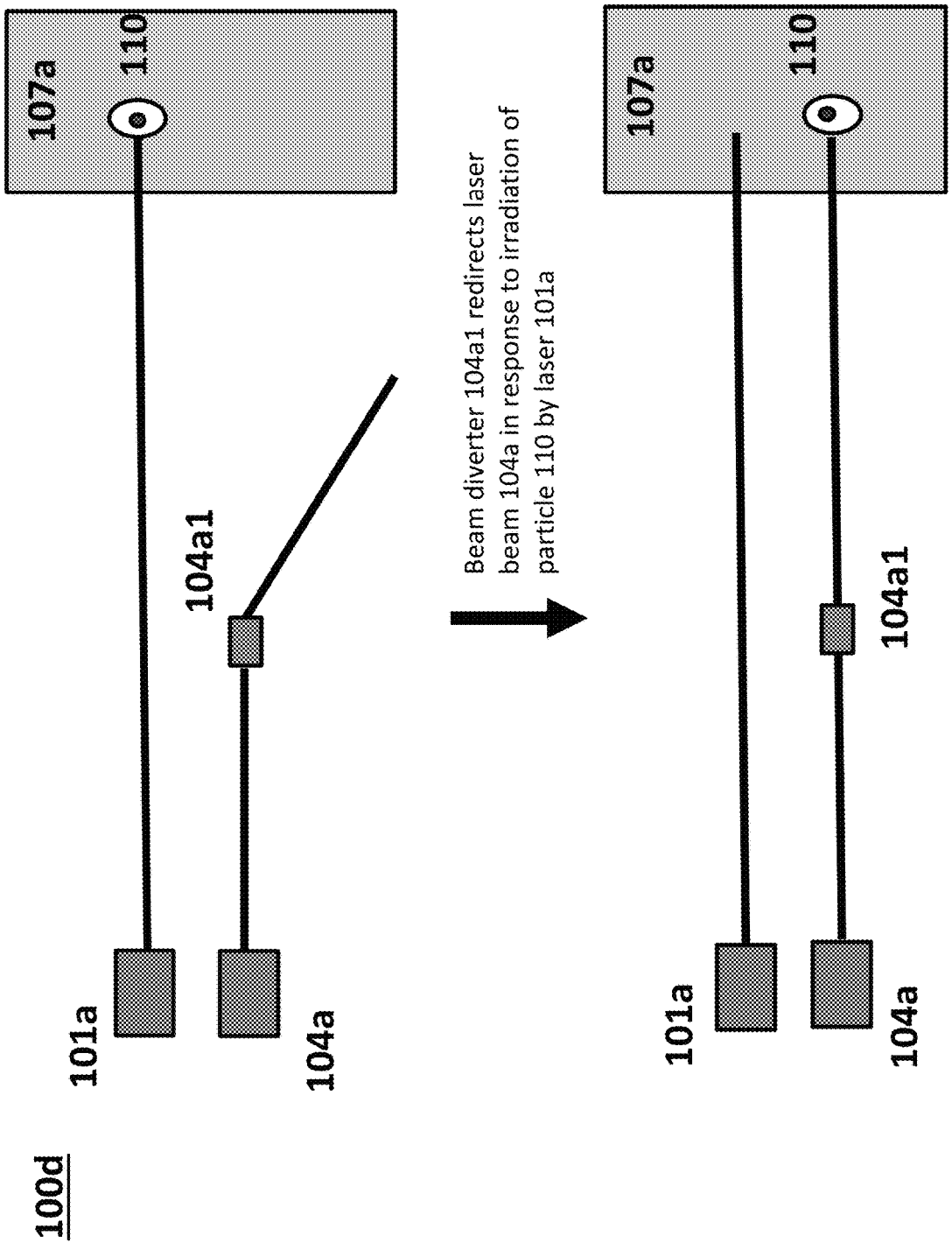

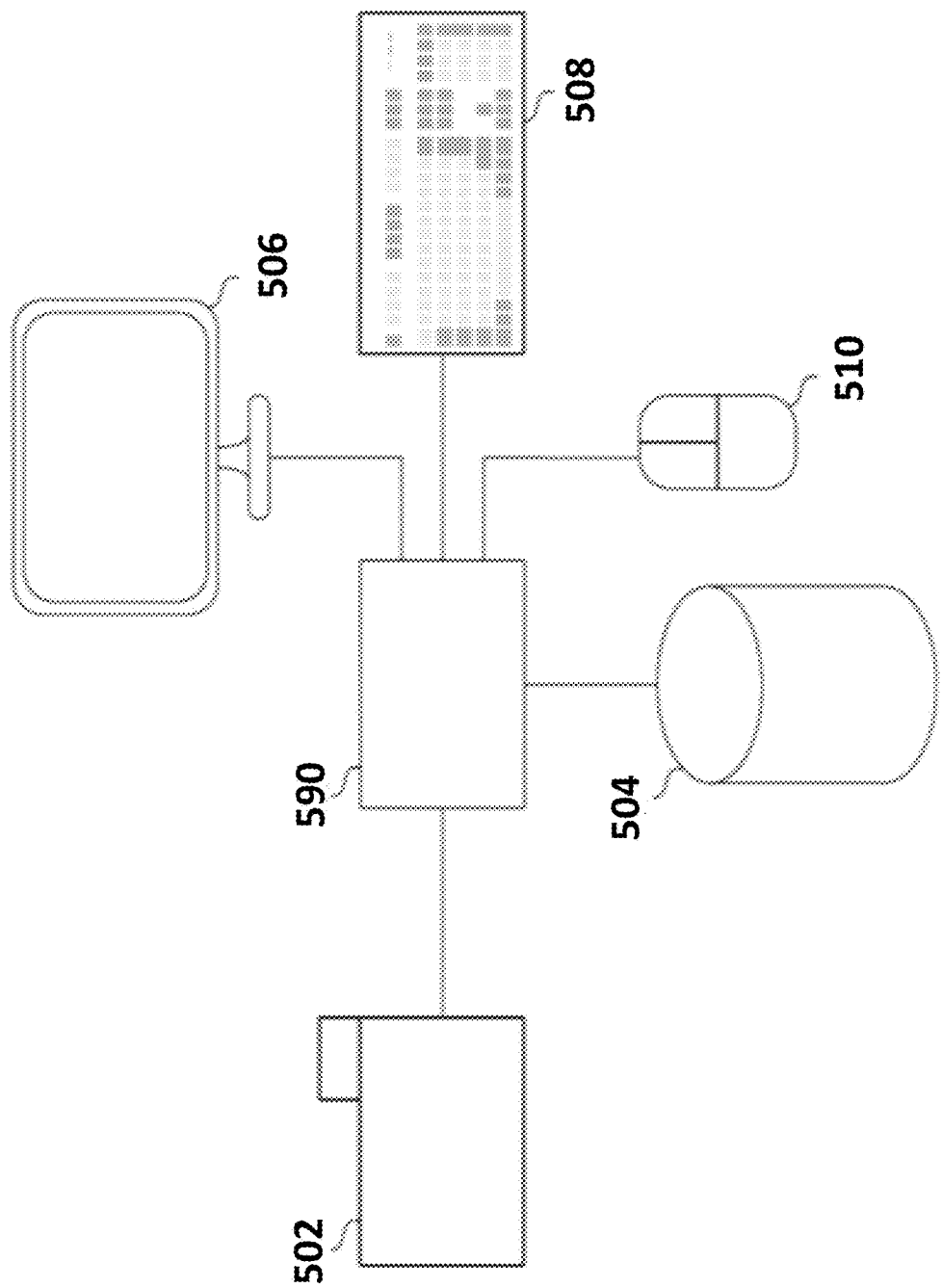

STROBED LASER EXCITATION SYSTEMS AND METHODS OF USE THEREOF

CROSS-REFERENCE TO RELATED APPLICATION

This application is related to U.S. Provisional Patent Application Ser. No. 62/978,751 filed Feb. 19, 2020; the disclosure of which application is herein incorporated by reference.

INTRODUCTION

The characterization of analytes in biological fluids has become an important part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

To characterize the components in the flow stream, light must impinge on the flow stream and be collected. Light sources in flow cytometers can vary from broad spectrum lamps, light emitting diodes as well as single wavelength lasers. The light source is aligned with the flow stream and an optical response from the illuminated particles is collected and quantified.

SUMMARY

Aspects of the present disclosure include systems for irradiating particles in a flow stream. Systems according to certain embodiments include a first laser configured for continuous irradiation of a flow stream and a second laser configured for irradiation of the flow stream in discrete intervals where each discrete interval of irradiation by the second laser is triggered by irradiation of a particle in the flow stream with the first laser. In some embodiments, the second laser is configured to irradiate a position on the flow stream that is downstream from the first laser. In certain embodiments, the first laser is a laser that is configured to irradiate the flow stream with a wavelength of light that is less than the wavelength of light of the second laser. In certain instances, the first laser irradiates the flow stream with a wavelength of light that is less than light that is emitted from particles in the flow stream. For example, the wavelength of light of the first laser may be less than the fluorescence of particles (e.g., cells) in the flow stream.

In some embodiments, systems include a first laser configured for continuous irradiation of a flow stream and a plurality of lasers configured for irradiation of the flow stream in discrete intervals, such as 2 or more lasers for irradiating the flow stream in discrete intervals, such as 3 or more lasers and including 4 or more lasers for irradiating the flow stream in discrete intervals. In some instances, the plurality of lasers configured for irradiating the flow stream in discrete intervals are positioned to irradiate the flow stream downstream from the first laser. In certain instances, each of the lasers are configured to independently irradiate positions on the flow stream that are spaced apart from each other by 10 µm or less, such as 9 µm or less, such as 8 µm or less, such as 7 µm or less, such as 6 µm or less and including positions on the flow stream that are spaced apart by 5 µm or less. In embodiments, each of the lasers is configured to independently irradiate the flow stream for a discrete interval that ranges from 0.001 µs to 500 ms, such as from 1 µs to 5000 µs.

In some embodiments, systems are configured to determine the timing and duration of irradiation by each of the lasers. In some instances, systems include processor having memory operably coupled to the processor where the memory includes instructions stored thereon, which when executed by the processor, cause the processor to calculate timing of irradiation (i.e., when to start the discrete interval of irradiation) of the flow stream by each of the lasers. In other instances, the memory includes instructions which when executed by the processor, cause the processor to calculate the duration of irradiation (i.e., the length of each discrete interval) of the flow stream by each of the lasers. In yet other instances, the memory includes instructions which when executed by the processor, cause the processor to calculate a time interval between irradiation of the flow stream by each of the lasers.

In some embodiments, systems are configured to turn on one or more downstream lasers in response to irradiation of a particle in the flow stream by the first laser. In some embodiments, systems include a beam stop positioned in the beam path between one or more the downstream lasers and the flow stream where the beam stop is configured to be moved in response to irradiation of a particle by the first laser. In some embodiments, systems include a beam diverter positioned in the beam path between one or more the downstream lasers and the flow stream where the beam diverter is configured to direct light to the flow stream in response to irradiation of a particle by the first laser. In some instances, the beam diverter is an acousto-optical device such as an acousto-optical deflector (AOD) or an acousto-optical modulator (AOM). In some instances, the beam diverter is an electro-optical device such as an electro-optical deflector (EOD) or an electro-optical modulator (EOM).

In some embodiments, systems include a light detection system for detecting light from particles in the irradiated flow stream. Light detection systems according to certain embodiments include a photodetector and an optical adjustment component that is configured to reduce the amount of light that is conveyed from the first laser to the photodetector. In some instances, the optical adjustment component is a bandpass filter, such as a long pass filter which conveys a spectral range of light that is longer than the irradiating wavelength of the first laser. In other instances, the optical adjustment component is a dichroic mirror, such as a dichroic mirror which conveys a spectral range of light that is longer than the irradiating wavelength of the first laser and reflects a spectral range of light that includes the irradiating wavelength of the first laser.

In embodiments, the photodetector is configured to detect light from the flow stream irradiated by each of the lasers. In some embodiments, the photodetector includes only a single photosensor component. In other embodiments, the photodetector is a photodetector array. In certain embodiments, the light detection system includes an optical propagation component to convey light from the flow stream to the photodetector. In some instances, the optical propagation component includes fiber optics. In certain instances, the optical propagation component includes a single fiber optic.

Aspects of the present disclosure also include methods for irradiating a sample in a flow stream. Methods according to certain embodiments include continuously irradiating a flow stream with a first laser and irradiating the flow stream in discrete intervals with a second laser. In embodiments, each discrete interval of irradiation by the second laser is triggered by irradiation of a particle in the flow stream with the first laser. In some embodiments, methods include irradiating with the second laser a position on the flow stream that is downstream from the first laser. In certain embodiments, the wavelength of light of the first laser is less than the wavelength of light of the second laser.

In some embodiments, methods include continuously irradiation a flow stream with a first laser and irradiating the flow stream in discrete intervals with a plurality of lasers, such as with 2 or more lasers, such as 3 or more lasers and including with 4 or more lasers. In certain instances, the flow stream is irradiated with the plurality of lasers at positions downstream from irradiation of the flow stream by the first laser. In some instances, the stream is irradiated with the plurality of lasers at positions that are spaced apart from each other by 10 μm or less, such as 5 μm or less. In some instances, the stream is irradiated with each of the plurality of lasers for a discrete interval that ranges from 0.001 μs to 500 ms, such as from 1 μs to 5000 μs.

In certain embodiments, methods include determining one or more of the timing and duration of irradiation of the flow stream by each of the lasers. In some instances, the timing of irradiation (i.e., when to start irradiation) by one or more of the lasers is determined. In other instances, the duration of irradiation (i.e., the length of each discrete interval) by one or more of the lasers is determined. In yet other instances, the time interval between irradiation of the flow stream by each of the lasers is determined. In certain instances, methods include continuously irradiating a particle in the flow stream with each of the lasers; detecting light from the flow stream in response to irradiation of the particle with each of the lasers; and calculating a time interval between irradiation of the particle by each of the lasers.

In some embodiments, methods include turning on one or more downstream lasers in response to irradiation of a particle in the flow stream by the first laser. In some embodiments, methods include moving a beam stop that is positioned in the beam path between one or more the downstream lasers and the flow stream in response to irradiation of the particle by the first laser. In some embodiments, methods include directing light from one or more of the downstream lasers with a beam diverter to the flow stream in response to irradiation of a particle by the first laser. In some instances, the beam diverter is an acousto-optical device such as an acousto-optical deflector (AOD) or an acousto-optical modulator (AOM). In some instances, the beam diverter is an electro-optical device such as an electro-optical deflector (EOD) or an electro-optical modulator (EOM).

Methods of the present disclosure also include detecting light from a particle in the flow stream with a light detection system. In some embodiments, the light detection system includes a photodetector and an optical adjustment component that is configured to reduce the amount of light that is conveyed from the first laser to the photodetector. In some embodiments, light from the flow stream is detected by the photodetector through a bandpass filter. In other embodiments, light from the flow stream is detected by the photodetector through a dichroic mirror.

Non-transitory computer readable storage medium for practicing the subject methods are also described. A non-transitory computer readable storage medium according to certain embodiments include instructions stored thereon having algorithm for continuously irradiating a flow stream with a first laser, algorithm for irradiating the flow stream in discrete intervals with a second laser, where each discrete interval for irradiation by the second laser is triggered by irradiation of a particle in the flow stream with the first laser, algorithm for detecting light from particles in the flow stream irradiated by each of the lasers with a single photodetector coupled to a single fiber optic and algorithm for calculating a timing of irradiation of the flow stream by each of the lasers. In some embodiments, the non-transitory computer readable storage medium includes instructions having algorithm for continuously irradiating a flow stream with a first laser; and algorithm for irradiating the flow stream in discrete intervals with a plurality of lasers, where each discrete interval for irradiation by the each of the plurality of lasers is triggered by irradiation of a particle in the flow stream with the first laser. In some instances, the non-transitory computer readable storage medium includes instructions having algorithm for continuously irradiating a particle in the flow stream with each of the lasers, algorithm for detecting light from the flow stream in response to irradiation of the particle with each of the lasers and algorithm for calculating a time interval between irradiation of the particle by each of the lasers.

In some embodiments, the non-transitory computer readable storage medium includes instructions having algorithm for turning on the second laser in response to irradiation of a particle by the first laser. In some embodiments, the non-transitory computer readable storage medium includes instructions having algorithm for moving a beam stop positioned in the beam path between the second laser and the flow stream in response to irradiation of a particle by the first laser. In some embodiments, the non-transitory computer readable storage medium includes instructions having algorithm for directing light from the second laser to the flow stream with a beam diverter in response to irradiation of a particle by the first laser.

Kits including one or more components of the subject systems are also provided. Kits according to certain embodiments include one or more lasers, such as a laser that is configured for continuous irradiation and a laser that is configured for irradiation in discrete intervals. In some embodiments, kits may include a switch for operating one or more of the lasers in discrete intervals (e.g., pulsing the laser). Kits may also include an optical adjustment component that is configured to reduce the passage of the wavelength of light of one or more of the lasers. In some instances, the optical adjustment component is a bandpass filter, such as a long pass filter which conveys a spectral range of light that is longer than the irradiating wavelength of one or more of the lasers. In other instances, the optical adjustment component is a dichroic mirror, such as a dichroic mirror which conveys a spectral range of light that is longer than the irradiating wavelength of one or more of the lasers and reflects a spectral range of light that includes the wavelength of one or more of the lasers.

Kits may also include a photodetector array for detecting light from the flow stream. In certain embodiments, the support stage includes a motor, such as a step motor. The subject kits may also include optical relay systems for propagating light from the sample in the flow stream to the detector, such fiber optics (e.g., a single fiber optic).

BRIEF DESCRIPTION OF THE FIGURES

The invention may be best understood from the following detailed description when read in conjunction with the accompanying drawings. Included in the drawings are the following figures:

FIG. 1B depicts a light source having a first laser configured for continuous irradiation of a flow stream and a second laser configured to be turned on in response to irradiation of a particle by the first laser according to certain embodiments. FIG. 1C depicts a light source having a first laser configured for continuous irradiation of a flow stream and a second laser that is configured to irradiate the flow stream when a beam stop is moved in response to irradiation of a particle by the first laser according to certain embodiments. FIG. 1D depicts a light source having a first laser configured for continuous irradiation of a flow stream and a second laser that is configured to irradiate the flow stream when a beam diverter re-directs light to the flow stream in response to irradiation of a particle by the first laser according to certain embodiments.

FIG. 5 depicts a functional block diagram for one example of a particle analyzer control system according to certain embodiments.

DETAILED DESCRIPTION

Figure 1A:
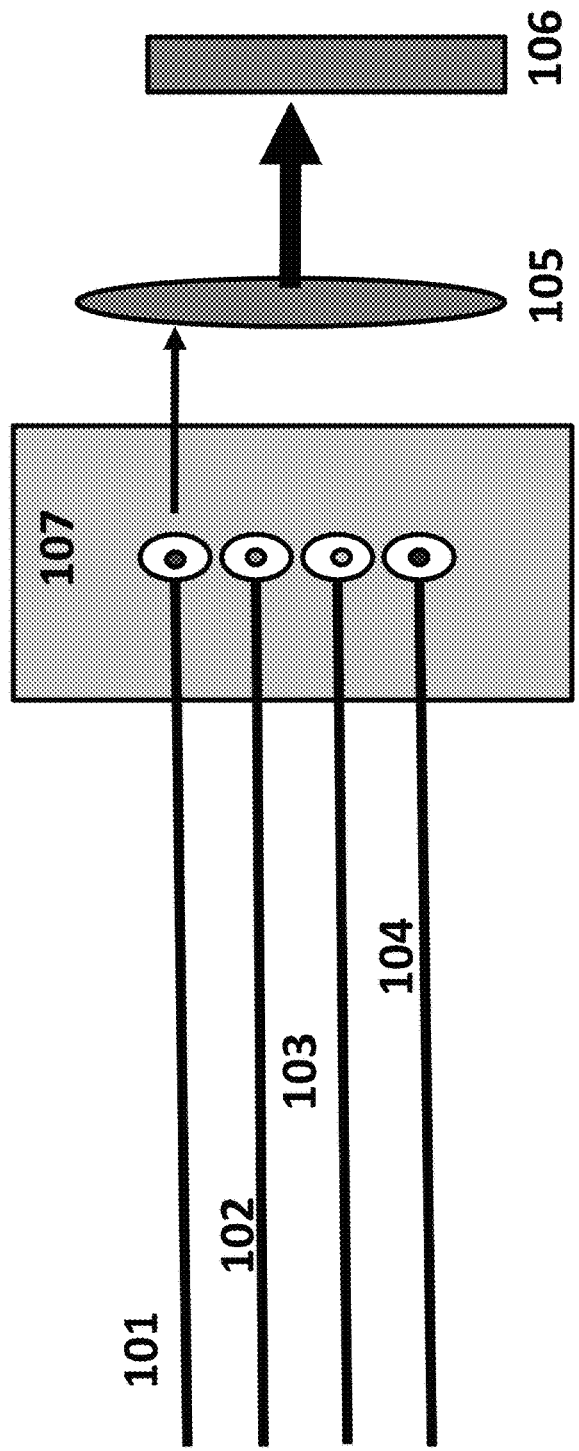
FIG. 1A depicts a light source having a laser configured for continuous irradiation and three lasers configured for irradiation in discrete intervals according to certain embodiments.

Aspects of the present disclosure include systems for irradiating particles in a flow stream. Systems according to certain embodiments include a light source having a first laser configured for continuous irradiation of a flow stream and a second laser configured for irradiation of the flow stream in discrete intervals where each discrete interval of irradiation by the second laser is triggered by irradiation of a particle in the flow stream with the first laser. Methods for irradiating a sample in a flow stream with the subject light sources are also described. Computer readable storage medium for practicing the subject methods are provided. Kits having one or more lasers are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for irradiating particles in a flow stream. In further describing embodiments of the disclosure, systems having a first laser configured for continuous irradiation and a second laser configured for irradiation in discrete intervals are first described in greater detail. Next, methods for irradiating a sample in a flow stream and detecting light from particles in the flow stream are described. Kits having one or more components of the subject systems are also provided.

Systems for Irradiating Particles in a Flow Stream

Aspects of the present disclosure include systems for irradiating particles in a flow stream. Systems according to certain embodiments include a first laser configured for continuous irradiation of a flow stream and a second laser configured for irradiation of the flow stream in discrete intervals where each discrete interval of irradiation by the second laser is triggered by irradiation of a particle in the flow stream with the first laser. As described herein, the term "continuous" is used herein in its conventional sense to refer to laser irradiation of the flow stream which is constant and not otherwise interrupted for the duration that a sample of interest is flowed through the flow stream. In some embodiments, a laser configured for continuous irradiation is a laser that is unobscured (i.e., not intermittently blocked with a beam stop or obscuration component). In certain instances, continuous irradiation of the flow stream with the laser includes maintaining a constant laser irradiation intensity, such as a laser irradiation intensity that changes by 5% or less for the duration that a sample of interest is flowed through the flow stream, such as by 4% or less, such as by 3% or less, such as by 2% or less, such as by 1% or less, such as by 0.5% or less, such as by 0.1% or less, such as by 0.01% or less, such as by 0.001% or less and including a laser irradiation intensity that changes by 0.0001% or less. In certain embodiments, the laser configured for continuous irradiation of the flow stream exhibits no change in intensity for the duration that a sample is flowed through the flow stream. The intensity of light output by the laser configured for continuous irradiation can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In embodiments, lasers configured for continuous irradiation may vary and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In others instances, the laser configured for continuous irradiation is a dye laser, such as a stilbene, coumarin or rhodamine laser. In yet other instances, lasers configured for continuous irradiation of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, systems include a semiconductor diode laser, optically pumped semiconductor laser (OPSL), or a frequency doubled- or frequency tripled implementation of any of the above mentioned lasers.

Systems of interest according to embodiments also include one or more lasers configured for irradiation of the flow stream in discrete intervals. The term "discrete interval" is used herein in its conventional sense to refer to irradiation of the flow stream for a predetermined duration of time followed by a period of time where the flow stream is not irradiated by the laser (e.g., by turning off the laser or by blocking the laser such as with a chopper, beam stop, etc.). In some embodiments, lasers are configured for irradiating the flow stream in discrete intervals of 0.001 µs or more, such as for 0.005 µs or more, such as for 0.01 µs or more, such as for 0.05 µs or more, such as for 0.1 µs or more, such as for 0.5 µs or more, such as for 1 µs or more, such as for 5 µs or more, such as for 10 µs or more, such as for 50 µs or more, such as for 100 µs or more and including for 500 µs or more. In certain instances, discrete intervals for irradiating the flow stream may range from 0.0001 µs to 500 ms, such as from 0.0005 µs to 250 ms, such as from 0.001 µs to 50 ms, such as from 0.005 µs to 5 ms, such as from 0.01 µs to 1000 µs, such as from 0.05 to 750 µs, such as from 0.1 µs to 500 µs, such as from 0.5 µs to 250 µs, such as from 1 µs to 100 µs and including from 10 µs to 100 µs. The duration between each discrete interval of irradiation by each laser may be 0.001 µs or more, such as 0.005 µs or more, such as 0.01 µs or more, such as 0.05 µs or more, such as 0.1 µs or more, such as 0.5 µs or more, such as 1 µs or more, such as 5 µs or more, such as 10 µs or more, such as 50 µs or more, such as 100 µs or more and including 500 µs or more. For example, the duration between each discrete interval of irradiation by each laser may range from 0.0001 µs to 500 ms, such as from 0.0005 µs to 250 ms, such as from 0.001 µs to 50 ms, such as from 0.005 µs to 5 ms, such as from 0.01 µs to 1000 µs, such as from 0.05 to 750 µs, such as from 0.1 µs to 500 µs, such as from 0.5 µs to 250 µs, such as from 1 µs to 100 µs and including from 10 µs to 100 µs.

In some embodiments, light sources of interest include 2 lasers or more configured for irradiating the flow stream in discrete intervals, such as 3 lasers or more, such as 4 lasers or more, such as 5 lasers or more, such as 10 lasers or more, such as 15 lasers or more, such as 25 lasers or more and including 50 lasers or more configured for irradiating the flow stream in discrete intervals. To irradiate the flow stream in discrete intervals, each laser may be operationally coupled to one or more components to provide for intermittent irradiation with each laser. Any convenient protocol can be used to provide intermittent irradiation, such as an electronic switch for turning the laser on-and-off, such as a switch that is computer-controlled and triggered based on a data signal (e.g., received or inputted data signal) as described in greater detail below. In some embodiments, lasers are configured for irradiation in discrete intervals by intermittently exposing the laser beam of each laser to a beam chopper or beam stop.

In certain embodiments, each of the lasers is configured for irradiating the flow stream in discrete intervals at a position on the flow stream that is downstream from the position of irradiation by the laser configured for continuous irradiation. For instance, in one example, light sources of interest include a first laser configured for continuous irradiation of the flow stream; a second laser configured to irradiate the flow stream at a position downstream from the first laser; a third laser configured to irradiate the flow stream at a position downstream from the second laser; and a fourth laser configured to irradiate the flow stream at a position downstream from the third laser. Depending on the flow rate of the flow stream and the distance between the position of irradiation by each laser, each of the lasers is configured to independently irradiate the flow stream at a position that is 5 µm or more downstream from the position of irradiation by the first laser, such as 6 µm or more, such as 7 µm or more, such as 8 µm or more, such as 9 µm or more, such as 10 µm or more, such as 15 µm or more, such as 25 µm or more, such as 50 µm or more, such as 100 µm or more, such as 250 µm or more, such as 500 µm or more and including where each laser is independently configured to irradiate the flow stream in discrete intervals at a position that is 1000 µm or more downstream from the position of irradiation by the first laser. For instance, the position of irradiation of the flow stream by each laser may be downstream from the position of irradiation of the flow stream by the first laser by a distance of from 5 µm to 5000 µm, such as from 10 µm to 2500 µm, such as from 25 µm to 1000 µm, such as from 50 µm to 750 µm, such as from 75 µm to 500 µm and including from 100 µm to 250 µm.

FIG. 1A depicts a light source having a laser configured for continuous irradiation and three lasers configured for irradiation in discrete intervals according to certain embodiments. Light source 100a includes laser 101 configured for continuous irradiation and lasers 102, 103 and 104 that are each positioned downstream from laser 101 along flow stream 107 and are configured for irradiation in discrete intervals. Light source 100 includes a bandpass filter 105 which is configured to reduce the amount of light conveyed to photodetector 106 from continuously irradiating laser 101.

The distance between irradiation on the flow stream by each of the lasers may vary, where the inter-irradiation space is independently 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such 8 µm or more, such as 9 µm or more and including 10 µm or more. In certain instances, the lasers in the subject light sources are configured to irradiate positions on the flow stream that are immediately adjacent to each other (i.e., there is no inter-irradiation space).

In embodiments, lasers configured for irradiation of the flow stream in discrete intervals may vary and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the laser configured for continuous irradiation is a dye laser, such as a stilbene, coumarin or rhodamine laser. In yet other instances, lasers configured for continuous irradiation of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, systems include a semiconductor diode laser, optically pumped semiconductor laser (OPSL), or a frequency doubled- or frequency tripled implementation of any of the above mentioned lasers. The lasers may include any combination of types of lasers. For example, in some embodiments, the subject systems include an array of lasers that are configured for irradiation in discrete intervals, such as an array having one or more gas lasers, one or more dye lasers and one or more solid-state lasers. In certain embodiments, systems of interest include an array of continuous wave diode lasers.

Depending on the desired wavelengths of light produced in the output laser beam (e.g., for use in irradiating a sample in a flow stream), each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser. In some embodiments, each of the lasers outputs a different wavelength of light. In certain instances, lasers of the systems are positioned such that each downstream laser outputs a longer wavelength of light. For example, where the system includes four lasers, the wavelength of light from the second laser is longer than the wavelength of light from the first laser, the wavelength of light from the third laser is longer than the wavelength of light from the second laser and the wavelength of light from the fourth laser is longer than the wavelength of light from the third laser.

Light sources may also include one or more optical adjustment components. The term "optical adjustment" is used herein in its conventional sense to refer to any device that is capable of changing the spatial width of irradiation or some other characteristic of irradiation from one or more of the lasers, such as for example, irradiation direction, wavelength, beam width, beam intensity, focal point and pulse width. Optical adjustment protocols may be any convenient device which adjusts one or more characteristics of the laser, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics. In some embodiments, the beams of light from each laser are combined by a beam combiner, such as a dichroic mirror beam combiner. In these embodiments, the beam combiner combines the light beams from each laser and propagates the light to the beam shaping component.

In certain embodiments, light from each laser is propagated to the flow stream via a mirror component. In some instances, the mirror component may include a first mirror and a second mirror positioned to propagate light from the first mirror to the flow stream. In embodiments, the second mirror is positioned to propagate light from the first mirror at an angle that varies with respect to the first mirror, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to orthogonally propagate light from the first mirror. In other embodiments, the second mirror is positioned to propagate light from the first mirror at an angle that varies with respect to the laser, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to propagate light orthogonally with respect to the laser. In some embodiments, the second mirror is also a beam combiner configured to combine the beams of light from the two or more lasers. In these embodiments, the second mirror may be a dichroic mirror, which selectively passes wavelengths of light as desired.

In some embodiments, optical adjustment components (e.g., a beam stopper or beam chopper component) are movable. In some instances, the optical adjustment component is movable in two dimensions, such as in an X-Y plane. In other instances, the optical adjustment component is movable in three dimensions. In some embodiments, the one or more optical adjustment components are configured to change angles, such as tilted with respect to the laser. For example, systems may be configured to change the position of irradiation on the flow stream by changing the angle of a mirror with respect to the laser by 5° or more, such as by 10° or more, such as by 15° or more, such as by 20° or more, such as by 30° or more, such as by 45° or more, such as by 60° or more and including by 75° or more.

Where the optical adjustment component (e.g., one or more beam stoppers, beam choppers, etc.) is configured to move, the optical adjustment component may be configured to be moved continuously or in discrete intervals. In some embodiments, movement of the optical adjustment component is continuous. In other embodiments, the optical adjustment component is movable in discrete intervals, such as for example in 0.01 micron or greater increments, such as 0.05 micron or greater, such as 0.1 micron or greater, such as 0.5 micron or greater, such as 1 micron or greater, such as 10 micron or greater, such as 100 microns or greater, such as 500 microns or greater, such as 1 mm or greater, such as 5 mm or greater, such as 10 mm or greater and including 25 mm or greater increments.

Any displacement protocol may be employed to move the optical adjustment component structures, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

In certain embodiments, the laser configured for continuous irradiation and the one or more lasers configured for irradiation in discrete intervals is provided by a light beam generator that generates two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

Each of the lasers in the subject systems may be positioned at any suitable distance from the flow stream, such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or. In addition, the light source may be configured to irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

As described above, light sources of the subject systems include a first laser configured for continuous irradiation of a flow stream and one or more lasers configured for irradiation of the flow stream in discrete intervals where each discrete interval for irradiation by each of the lasers is triggered by irradiation of a particle in the flow stream with the laser configured for continuous irradiation. The term "triggered" is used herein in its conventional sense to refer to initiating irradiation by one or more of the lasers configured for irradiation in discrete intervals. In some embodiments, triggering irradiation by the laser includes turning the laser from an off setting to an on setting and irradiating the flow stream with the laser. In other embodiments, triggering irradiation by the laser includes moving a position or setting of an optical adjustment component such as a beam stopper to irradiate the flow stream with the laser. Any convenient protocol can be used to trigger one or more of the lasers, such as by detecting a particle being irradiated by the first laser with a photodetector (i.e., passing through the continuous light beam of the first laser). In certain embodiments, systems include a separate trigger detector which is operably coupled to each of the other lasers such that when a particle is detected as being irradiated by the continuous laser, a trigger signal is outputted to each of the lasers configured for discrete intervals sufficient to initiate a discrete interval of irradiation by one or more of the lasers.

In embodiments, the duration between when a particle is detected as being irradiated by the continuously irradiating laser and initiation of a discrete interval of irradiation by one or more of the lasers may vary depending on the flow rate of the flow stream and the distance between the positions of irradiation on the flow stream. In some embodiments, the duration between irradiation by the continuously irradiating laser and the initiation of a discrete interval of laser irradiation may be 0.0001 µs or more, such as 0.0005 µs or more, such as 0.001 µs or more, such as 0.005 µs or more, such as 0.01 µs or more, such as 0.05 µs or more, such as 0.1 µs or more, such as 0.5 µs or more, such as 1 µs or more, such as 2 µs or more, such as 3 µs or more, such as 4 µs or more, such as 5 µs or more, such as 6 µs or more, such as 7 µs or more, such 8 µs or more, such as 9 µs or more and including 10 µs or more. In certain embodiments, systems are configured to delay initiation of a discrete interval in response to the output of the trigger signal, such as where the delay is 0.0001 µs or more, such as 0.0005 µs or more, such as 0.001 µs or more, such as 0.005 µs or more, such as 0.01 µs or more, such as 0.05 µs or more, such as 0.1 µs or more, such as 0.5 µs or more, such as 1 µs or more, such as 2 µs or more, such as 3 µs or more, such as 4 µs or more, such as 5 µs or more, such as 6 µs or more, such as 7 µs or more, such 8 µs or more, such as 9 µs or more and including 10 µs or more.

In some embodiments, systems include a processor with memory operably coupled to the processor where the memory includes instructions stored thereon, which when executed by the processor, cause the processor to calculate the timing of initiating irradiation (i.e., when to start the discrete interval of irradiation) of the flow stream by each of the lasers. In some instances, to calculate the timing of irradiation, systems are configured to continuously irradiate a particle flowing in the flow stream with all of the lasers of the light source, detect light from the flow stream in response to irradiation of the particle with each of the lasers and calculate the time of irradiation of the particle by each of the lasers. In certain instances, calculating the time of initiating irradiation includes calculating a time interval between irradiation by each of the lasers.

In other embodiments, systems include a processor with memory operably coupled to the processor where the memory includes instructions stored thereon, which when executed by the processor, cause the processor to calculate the duration of irradiation (i.e., the length of each discrete interval) of the flow stream by each of the lasers. In some instances, to calculate the duration of irradiation, systems are configured to continuously irradiate a particle flowing in the flow stream with all of the lasers of the light source, detect light from the flow stream in response to irradiation of the particle with each of the lasers and calculate the duration of the discrete intervals of irradiation by each laser. In these instances, the duration of each discrete interval may be calculated based on the position of irradiation on the flow stream and the flow rate of the particle in the flow stream.

As described above, to irradiate the flow stream in discrete intervals, each laser may be operationally coupled to one or more components to provide for intermittent irradiation with each laser. In some embodiments, systems are configured to turn on one or more downstream lasers in response to irradiation of a particle in the flow stream by the first laser. Depending on the distance between the first laser and the one or more downstream lasers, each laser is configured to be independently turned on in response to irradiation by the first laser within 0.00001 µs or more, such as within 0.00005 µs or more, such as within 0.0001 µs or more, such as within 0.0005 µs or more, such as within 0.001 µs or more, such as within 0.005 µs or more, such as within 0.01 µs or more, such as within 0.05 µs or more, such as within 0.1 µs or more, such as within 0.5 µs or more and including within 1 µs or more. In certain instances, each laser configured to be independently turned on within from 0.00001 µs to 100 µs after irradiation of the particle by the first laser, such as from 0.00005 µs to 90 µs, such as from 0.0001 µs to 80 µs, such as from 0.0005 µs to 70 µs, such as from 0.001 µs to 60 µs, such as from 0.005 µs to 50 µs, such as from 0.01 µs to 40 µs, such as from 0.05 µs to 30 µs, such as from 0.1 µs to 20 µs and including from 1 µs to 10 µs.

FIG. 1B depicts a light source having a first laser configured for continuous irradiation of a flow stream and a second laser configured to be turned on in response to irradiation of a particle by the first laser according to certain embodiments. Light source 100b includes laser 101a configured for continuous irradiation of a flow stream in flow cell 107a and laser 102a positioned downstream from laser 101a. Laser 102a is in electrical communication with switch 102a1 which turns the laser on and off. Switch 102a1 is configured to turn on laser 102a when particle 110 is irradiated by laser 101a.

In some embodiments, systems include a beam stop positioned in the beam path between one or more the downstream lasers and the flow stream where the beam stop is configured to be moved in response to irradiation of a particle by the first laser. Any displacement protocol may be employed to move the beam stop, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors. The beam stop may be moved in response to irradiation by the first laser within 0.00001 µs or more, such as within 0.00005 µs or more, such as within 0.0001 µs or more, such as within 0.0005 µs or more, such as within 0.001 µs or more, such as within 0.005 µs or more, such as within 0.01 µs or more, such as within 0.05 µs or more, such as within 0.1 µs or more, such as within 0.5 µs or more and including within 1 µs or more. In certain instances, the beam stop is moved from the beam path of the one or more downstream lasers within from 0.00001 µs to 100 µs after irradiation of the particle by the first laser, such as from 0.00005 µs to 90 µs, such as from 0.0001 µs to 80 µs, such as from 0.0005 µs to 70 µs, such as from 0.001 µs to 60 µs, such as from 0.005 µs to 50 µs, such as from 0.01 µs to 40 µs, such as from 0.05 µs to 30 µs, such as from 0.1 µs to 20 µs and including from 1 µs to 10 µs.

FIG. 1C depicts a light source having a first laser configured for continuous irradiation of a flow stream and a second laser that is configured to irradiate the flow stream when a beam stop is moved in response to irradiation of a particle by the first laser according to certain embodiments. Light source 100c includes laser 101a configured for continuous irradiation of a flow stream in flow cell 107a and laser 103a positioned downstream from laser 101a. Light source 100c includes beam stop 103a1 positioned in a beam path between laser 103a and the flow stream. Beam stop 103a1 is configured to be moved from the beam path between laser 103a and the flow stream when particle 110 is irradiated by laser 101a.

In some embodiments, systems include a beam diverter positioned in the beam path between one or more the downstream lasers. In embodiments, the beam diverter is configured to divert light from the one or more downstream lasers from the flow stream until being triggered to re-direct light from the laser to the flow stream. In some instances, the beam diverter is configured to direct light to the flow stream in response to irradiation of a particle by the first laser. For example, a data signal may be generated in response to irradiation of the particle in the flow stream by the first laser and the beam diverter is configured direct diverted laser light to the flow stream in response to the generated data signal. In some instances, the beam diverter is an acousto-optical device such as an acousto-optical deflector (AOD) or an acousto-optical modulator (AOM). In these embodiments, the data signal may include a change in drive signals from a direct digital synthesizer (DDS), arbitrary waveform generator (AWG), or electrical pulse generator sufficient to direct light from the laser to the flow stream. In other instances, the beam diverter is an electro-optical device such as an electro-optical deflector (EOD) or an electro-optical modulator (EOM). In these embodiments, the data signal may include a change in current or an applied voltage to the electro-optical device sufficient to direct light from the laser to the flow stream. In some embodiments, the beam diverter is configured to re-direct the beam path of the one or more downstream lasers in response to irradiation by the first laser within 0.00001 µs or more, such as within 0.00005 µs or more, such as within 0.0001 µs or more, such as within 0.0005 µs or more, such as within 0.001 µs or more, such as within 0.005 µs or more, such as within 0.01 µs or more, such as within 0.05 µs or more, such as within 0.1 µs or more, such as within 0.5 µs or more and including within 1 µs or more. In certain instances, the beam diverter is configured to re-direct the beam path of the one or more downstream lasers within from 0.00001 µs to 100 µs after irradiation of the particle by the first laser, such as from 0.00005 µs to 90 µs, such as from 0.0001 µs to 80 µs, such as from 0.0005 µs to 70 µs, such as from 0.001 µs to 60 µs, such as from 0.005 µs to 50 µs, such as from 0.01 µs to 40 µs, such as from 0.05 µs to 30 µs, such as from 0.1 µs to 20 µs and including from 1 µs to 10 µs.

FIG. 1D depicts a light source having a first laser configured for continuous irradiation of a flow stream and a second laser that is configured to irradiate the flow stream when a beam diverter re-directs light to the flow stream in response to irradiation of a particle by the first laser according to certain embodiments. Light source 100d includes laser 101a configured for continuous irradiation of a flow stream in flow cell 107a and laser 104a positioned downstream from laser 101a. Light source 100d includes beam diverter 104a1 positioned in a beam path between laser 104a and the flow stream. Beam diverter is configured to divert the beam path of laser 104a away from the flow stream, such as by acousto-optical deflection (e.g., with an AOD) or electro-optical deflection (e.g., with an EOM). When particle 110 is irradiated by laser 101a, beam diverter is configured to re-direct the beam path of laser 104a to the flow stream.

In embodiments, light from particles irradiated in the flow stream with the subject light sources are conveyed to a light detection system. Light detection systems may include one or more photodetectors. Photodetectors in the subject systems may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. The light detection system for measuring light from particles in the flow stream may include 1 photodetector or more, such as 2 photodetectors or more, such as 3 photodetectors or more, such as 4 photodetectors or more, such as 5 photodetectors or more, such as 10 photodetectors or more, such as 25 photodetectors or more and including 50 photodetectors or more.

In certain embodiments, the systems of interest include a photodiode array having more than one photodiode, such as two or more photodiodes, such as three or more, such as five or more and including 10 or more photodiodes, where each photodiode may have an active detecting surface area of each region that ranges from $0.01$ $cm^2$ to $10$ $cm^2$, such as from $0.05$ $cm^2$ to $9$ $cm^2$, such as from, such as from $0.1$ $cm^2$ to $8$ $cm^2$, such as from $0.5$ $cm^2$ to $7$ $cm^2$ and including from $1$ $cm^2$ to $5$ $cm^2$.

In embodiments of the present disclosure, photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths.

In embodiments, the photodetectors are configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Each photodetector may be positioned at any suitable distance from the flow stream so long as a usable light signal is detectable. For example, detectors in the subject systems may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, systems are configured to detect forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light.

In certain embodiments, systems include a single photodetector that is configured to detect light from each of the lasers of the light source. In these embodiments, the photodetector detects light from particles in the flow stream that are irradiated with the laser configured for continuous irradiation and each laser that is configured for irradiation in discrete intervals.

In some embodiments, the light detection system includes an optical adjustment component that is configured to reduce the amount of light that is conveyed from the laser configured for continuous irradiation to the one or more photodetectors. In these embodiments, the optical adjustment component is configured to restrict, reduce or limit the propagation of at least one or more wavelengths of the light (e.g., one or more of the wavelengths of the light of the laser that is configured for continuous irradiation) from the sample to the active surface of the photodetector. The light conveyed to the photodetector may include an optical component that limits the propagation of one or more different wavelengths of light, such as 5 or more, such as 10 or more, such as 25 or more, such as 50 or more, such as 100 or more, such as 200 or more, such as 300 or more and including limiting the propagation of 500 or more different wavelengths of light. For example, in some embodiments, the optical adjustment component is a bandpass filter, such as a long pass filter which conveys a spectral range of light that is longer than the irradiating wavelength of the first laser. In other embodiments, the optical adjustment component is a dichroic mirror, such as a dichroic mirror which conveys a spectral range of light that is longer than the irradiating wavelength of the first laser and reflects a spectral range of light that includes the irradiating wavelength of the first laser.

In some embodiments, systems include an optical collection system for collecting and directing light from the flow stream to the light detection system. The optical collection system may be physically coupled to the light detection system, such as with an adhesive, co-molded together or integrated into the light detection system. In certain embodiments, the optical collection system and the light detection system are integrated into a single unit. In other embodiments, the optical collection system is coupled to the light detection system with an connector, such as with a hook and loop fasteners, magnets, latches, notches, countersinks, counter-bores, grooves, pins, tethers, hinges, Velcro, non-permanent adhesives or a combination thereof.

In other embodiments, the light detection system and the optical collection system are in optical communication, but are not physically in contact. For example, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In some embodiments, the optical collection system includes fiber optics. For example, in some instances the optical collection system may be a fiber optics light relay bundle and light is conveyed through the fiber optics light relay bundle to the light detection system. In certain embodiments, the optical collection unit is a single fiber optic that is configured to covey light from irradiation by each of the lasers to a single photodetector in the light detection system. In these embodiments, the positions of irradiation spanned by the lasers on the flow stream is equal to or less than the diameter of the single fiber optic configured to collect light from the flow stream. For example, lasers in the subject systems may be configured to irradiate positions on the flow stream that span 100 μm or less, such as 90 μm or less, such as 80 μm or less, such as 70 μm or less, such as 60 μm or less and including 50 μm or less and the single fiber optic may have a diameter which is sufficient to collect light from each of the positions irradiated by the lasers, such as a diameter of 50 μm or more, such as 60 μm or more, such as 70 μm or more, such as 80 μm or more, such as 90 μm or more and including where the single fiber optic configured to collect light from the irradiated flow stream is 100 μm or more.

Figure 2:
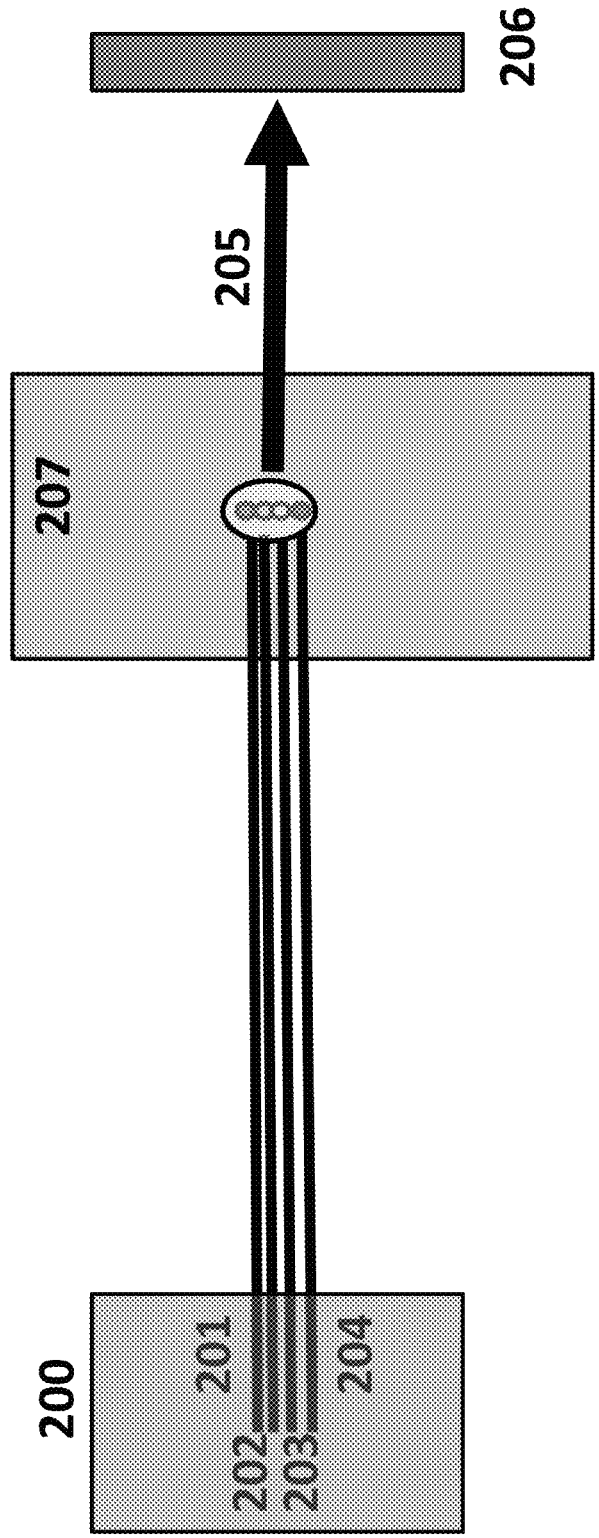
FIG. 2 depicts a light source having a laser configured for continuous irradiation and three lasers configured for irradiation in discrete intervals and a light detection system for conveying and measuring light with a single photodetector according to certain embodiments.

FIG. 2 depicts a light source having a laser configured for continuous irradiation and three lasers configured for irradiation in discrete intervals and a light detection system for conveying and measuring light with a single photodetector according to certain embodiments. Light source 200 includes laser 201 configured for continuous irradiation and lasers 202, 203 and 204 that are each positioned downstream from laser 201 along flow stream 207 and are configured for irradiation in discrete intervals. Lasers 201, 202, 203 and 204 are positioned nearly adjacent to each other so that light from flow stream 207 can be collected using a single fiber optic 205 and propagated to single photodetector 206, reducing the number of detector channels needed to detect light from the sample.

In other embodiments, the optical collection system is a free-space light relay system. For instance, the free-space light relay system may include a housing having a proximal end and a distal end, the proximal end being coupled to the light detection system. The free-space relay system may include any combination of different optical components, such as one or more lenses, mirrors, slits, pinholes, wavelength separators, or a combination thereof.

In some embodiments, systems include a flow cell configured to propagate particles in the flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. In some instances, the rate of sample flow in the flow cell is 1 nL/min or more, such as 2 nL/min or more, such as 3 nL/min or more, such as 5 nL/min or more, such as 10 nL/min or more, such as 25 nL/min or more, such as 50 nL/min or more, such as 75 nL/min or more, such as 100 nL/min or more, such as 250 nL/min or more, such as 500 nL/min or more, such as 750 nL/min or more and including 1000 nL/min or more. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including rom 10 nL/min to 50 nL/min. In certain embodiments, the flow rate of the flow stream is from 5 nL/min to 6 nL/min.

In certain embodiments, the subject systems are flow cytometric systems employing the above described light detection system for detecting light emitted by a sample in a flow stream. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSR-Fortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300;

7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain embodiments, the subject systems are flow cytometric systems having an excitation module that uses radio-frequency multiplexed excitation to generate a plurality of frequency shifted beams of light. In these embodiments, the laser light generator may include a plurality of lasers and one or more acousto-optic components (e.g., an acoustooptic deflector, an acoustooptic frequency shifter) to generate a plurality of frequency shifted comb beams. One or more of the frequency shifted comb beams and local oscillator beams may be configured to be received by a beam shaping component as described here to produce one or more beams of frequency shifted light having a substantially constant intensity profile. In certain instances, the subject systems are flow cytometric systems having a laser excitation module as described in U.S. Pat. Nos. 9,423,353 and 9,784,661 and U.S. Patent Publication Nos. 2017/0133857 and 2017/0350803, the disclosures of which are herein incorporated by reference.

Figure 4A:
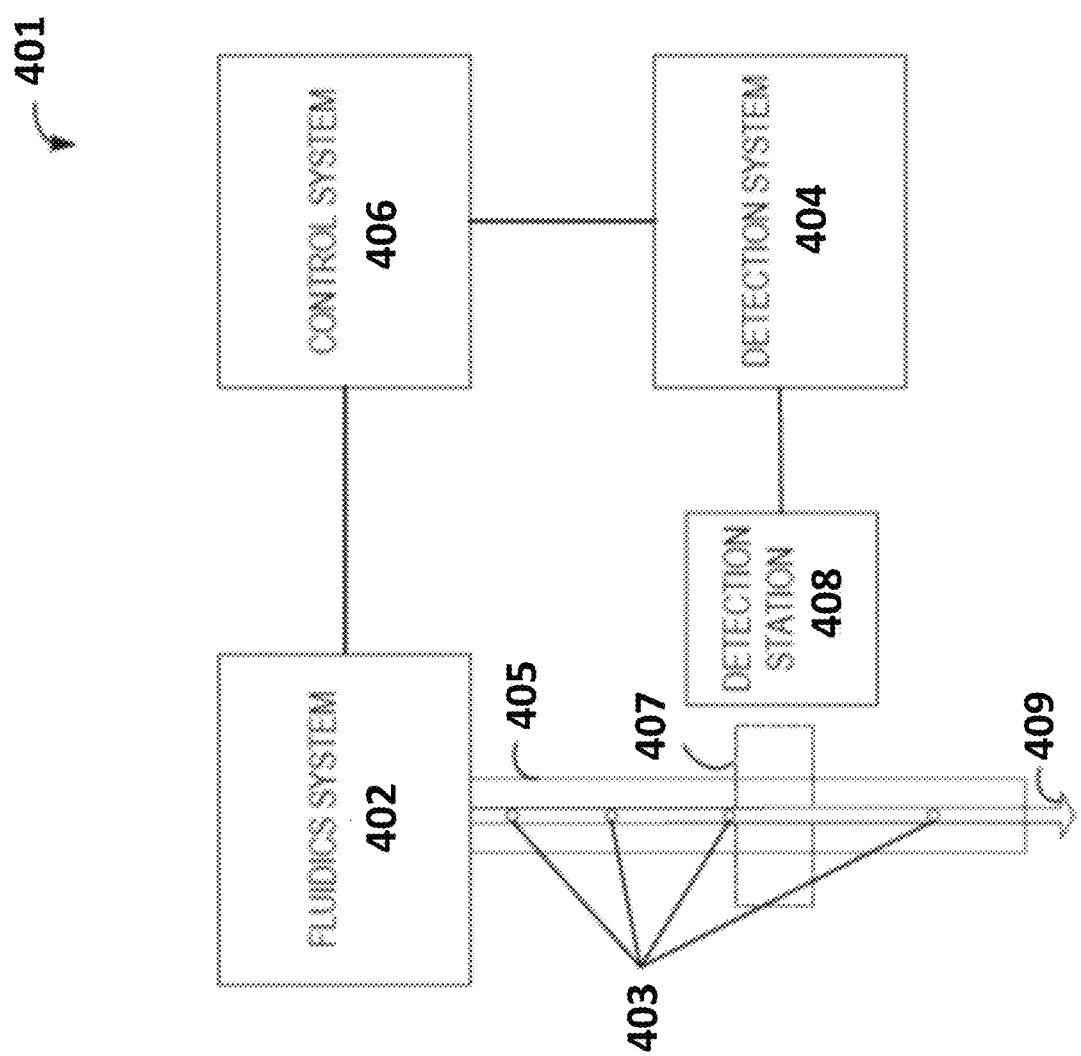
FIG. 4A depicts a functional block diagram of a particle analysis system according to certain embodiments.

In some embodiments, systems of interest include a particle analysis system which can be used to analyze and characterize particles, with or without physically sorting the particles into collection vessels. FIG. 4A shows a functional block diagram of an example of a particle analysis system. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
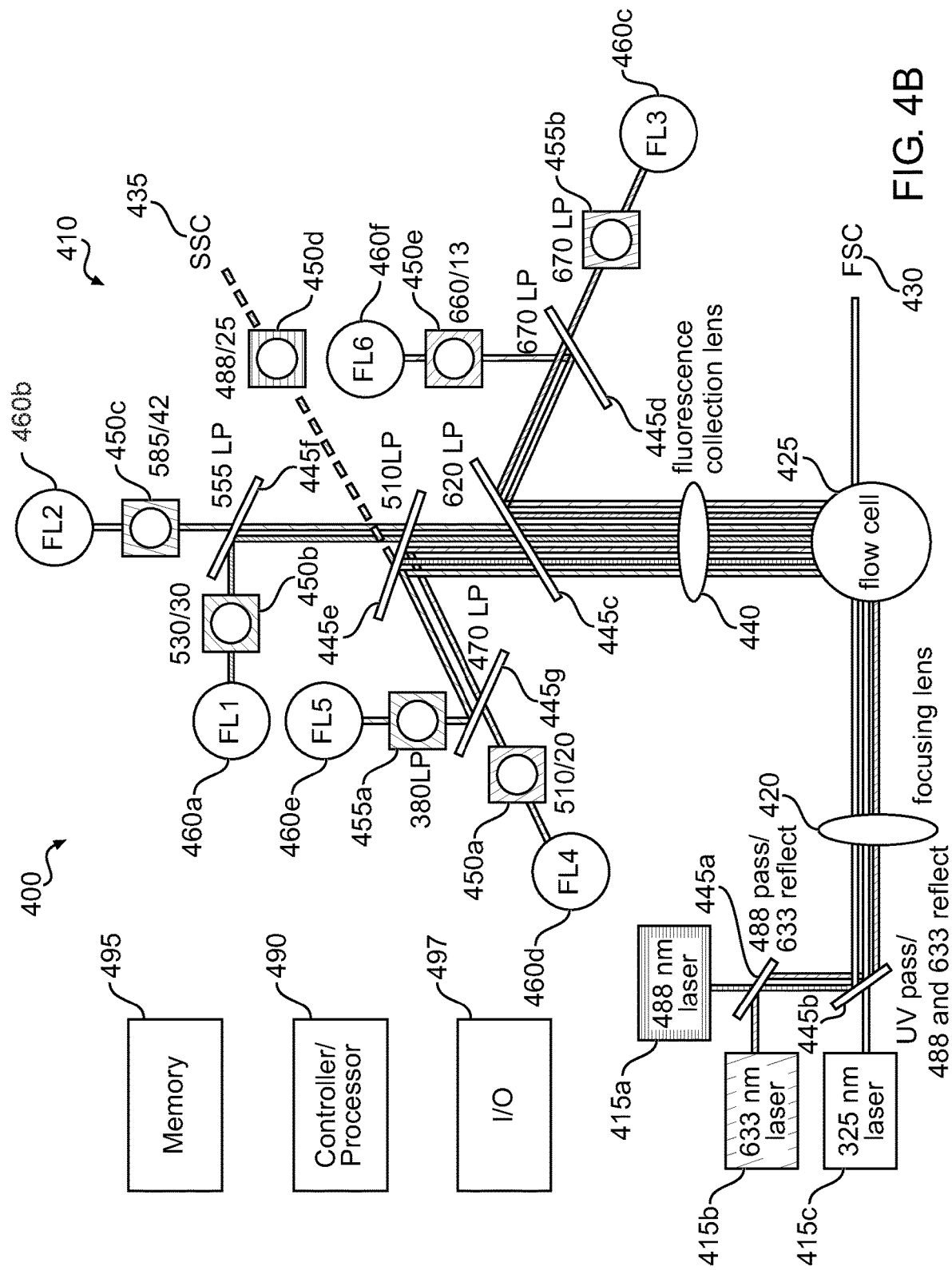
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

FIG. 5 shows a functional block diagram for one example of a particle analyzer control system 500 including an analytics controller 590, for analyzing and displaying biological events. An analytics controller 590 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 590. A data communication channel can be included between the particle analyzer or sorting system 502 and the analytics controller 590. The biological event data can be provided to the analytics controller 590 via the data communication channel.

The analytics controller 590 can be configured to receive biological event data from the particle analyzer or sorting system 502. The biological event data received from the particle analyzer or sorting system 502 can include flow cytometric event data. The analytics controller 590 can be configured to provide a graphical display including a first plot of biological event data to a display device 506. The analytics controller 590 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 590 can be further configured to display the biological event data on the display device 506 within the gate differently from other events in the biological event data outside of the gate. For example, the analytics controller 590 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 590 can be configured to receive a gate selection signal identifying the gate from a first input device. For example, the first input device can be implemented as a mouse 510. The mouse 510 can initiate a gate selection signal to the analytics controller 590 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 590 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 590 to alter the manner in which the data is displayed, which portions of the data is actually displayed on the display device 506, and/or provide input to further processing such as selection of a population of interest for particle sorting.

In some embodiments, the analytics controller 590 can be configured to detect when gate selection is initiated by the mouse 510. The analytics controller 590 can be further configured to automatically modify plot visualization to facilitate the gating process. The modification can be based on the specific distribution of biological event data received by the analytics controller 590.

The analytics controller 590 can be connected to a storage device 504. The storage device 504 can be configured to receive and store biological event data from the analytics controller 590. The storage device 504 can also be configured to receive and store flow cytometric event data from the analytics controller 590. The storage device 504 can be further configured to allow retrieval of biological event data, such as flow cytometric event data, by the analytics controller 590.

A display device 506 can be configured to receive display data from the analytics controller 590. The display data can comprise plots of biological event data and gates outlining sections of the plots. The display device 506 can be further configured to alter the information presented according to input received from the analytics controller 590 in conjunction with input from the particle analyzer 502, the storage device 504, the keyboard 508, and/or the mouse 510.

In some implementations, the analytics controller 590 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
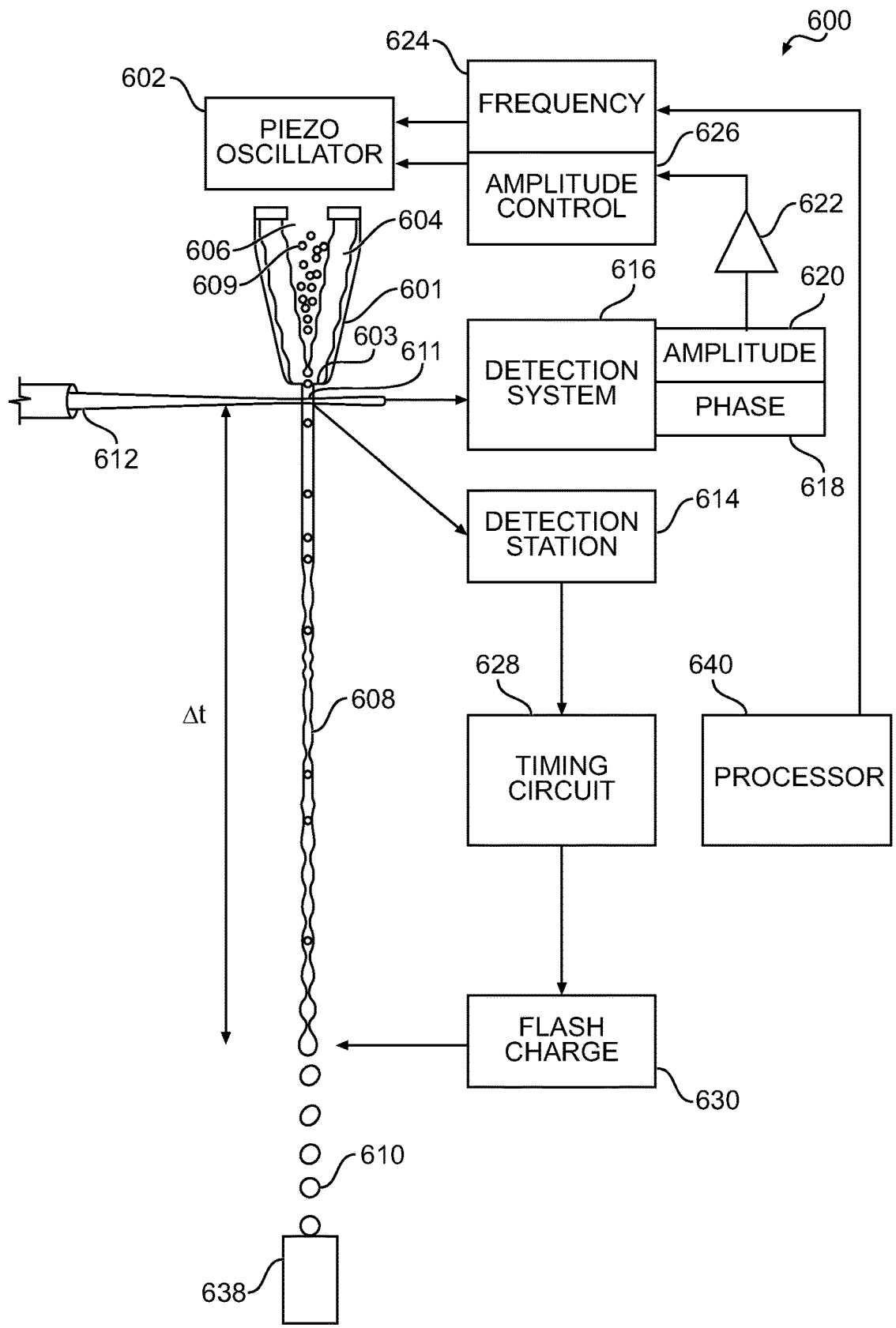
FIG. 6A depicts a schematic drawing of a particle sorter system according to certain embodiments.

In some embodiments, systems of interest include a particle sorter system. FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay ($\Delta t$), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
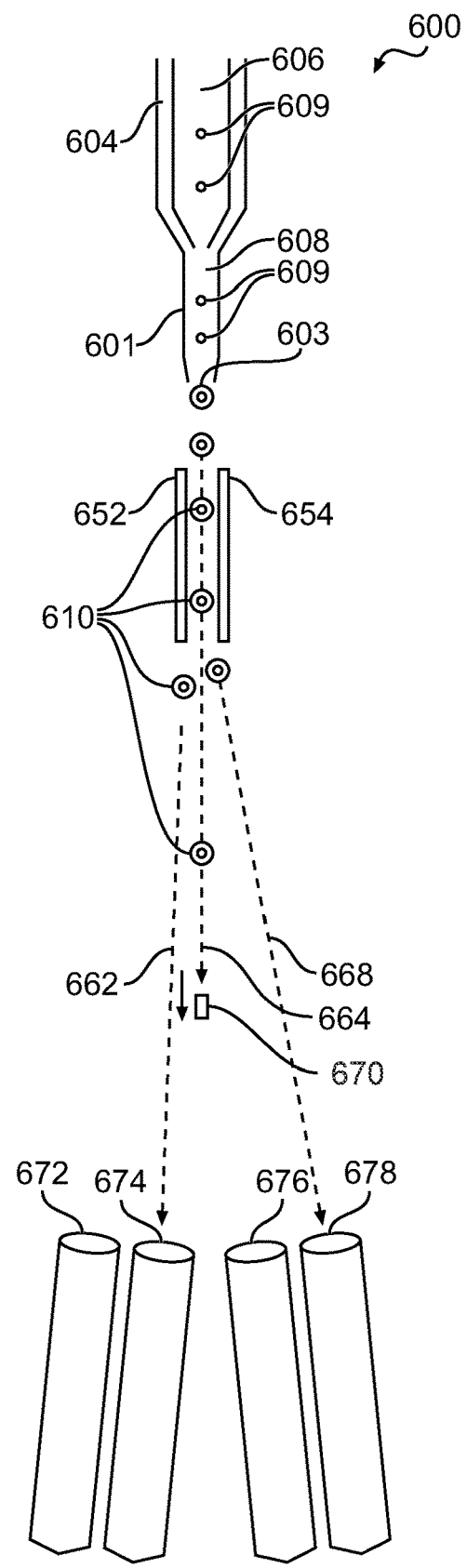
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 609 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, N.J.).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for continuously irradiating a flow stream with a first laser; and irradiating the flow stream in discrete intervals with a second laser. In some embodiments, the computer program includes instructions to trigger each discrete interval for irradiation by the second laser in response to irradiation of a particle in the flow stream with the first laser.

In some embodiments, computer-controlled systems configured for complete or partial automation include memory with instructions stored thereon, which when executed by the processor, cause the processor to calculate the timing of initiating irradiation (i.e., when to start the discrete interval of irradiation) of the flow stream by each of the lasers. In other embodiments, systems include a processor with memory operably coupled to the processor where the memory includes instructions stored thereon, which when executed by the processor, cause the processor to calculate the duration of irradiation (i.e., the length of each discrete interval) of the flow stream by each of the lasers In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
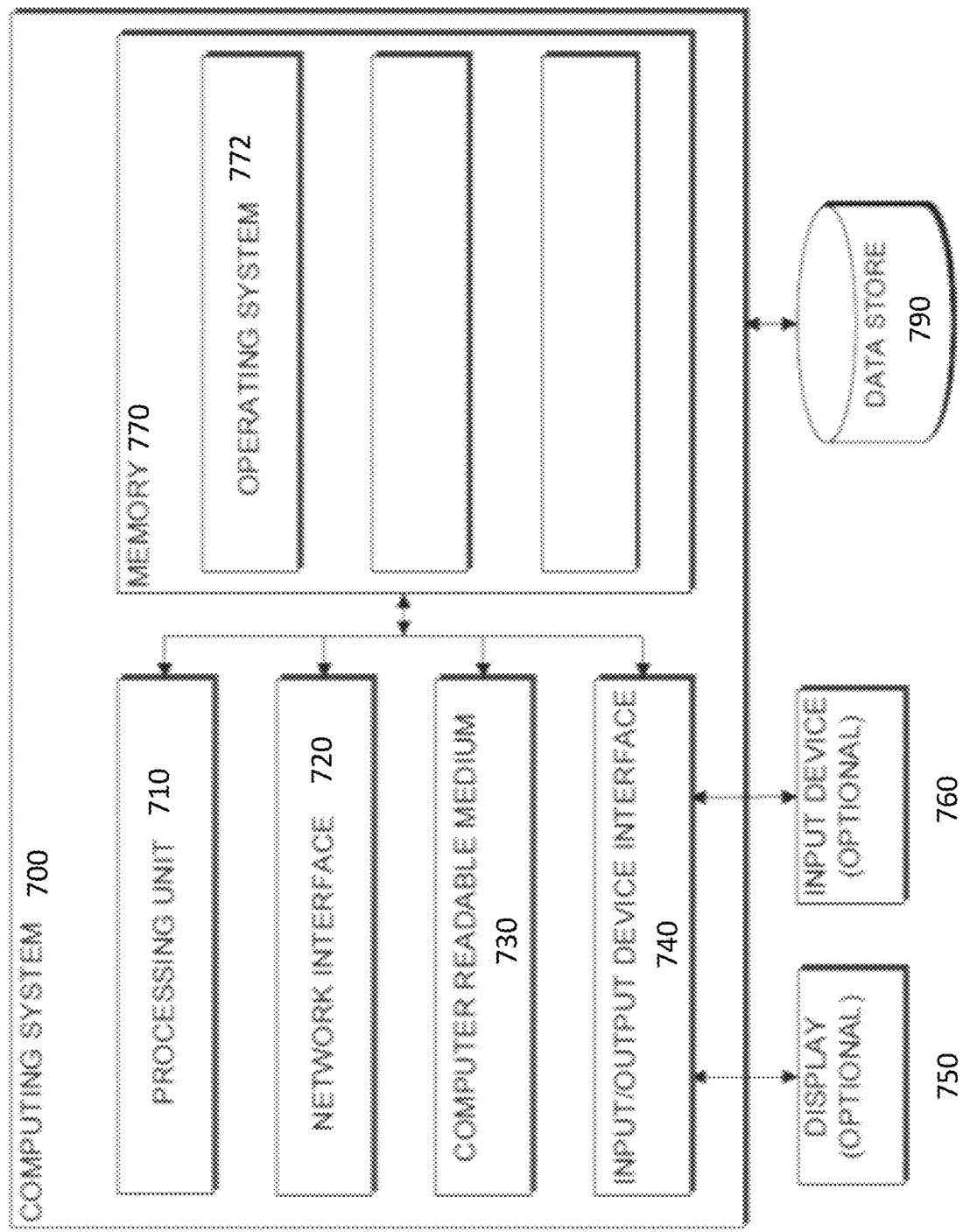
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The computing device 700 is additionally connected to data store 790. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods for Irradiating Particles in a Flow Stream

Aspects of the disclosure also include methods for irradiating a sample having particles in a flow stream. Methods according to certain embodiments include continuously irradiating a flow stream with a first laser and irradiating the flow stream in discrete intervals with one or more lasers. In embodiments, each discrete interval of irradiation by the one or more lasers is triggered by irradiation of a particle in the flow stream with the first laser. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In embodiments, methods include irradiating the sample in the flow stream with a laser configured for continuous irradiation. As described above, the term "continuous" is used herein in its conventional sense to refer to irradiating the flow stream with the laser in a constant manner which is not otherwise interrupted for the duration that a sample of interest is flowed through the flow stream. In some embodiments, continuously irradiating a sample includes irradiating the flow stream with a laser configured that is unobscured (i.e., not intermittently blocked with a beam stop or obscuration component). In certain instances, continuous irradiation of the flow stream with the laser includes maintaining a constant laser irradiation intensity, such as a laser irradiation intensity that changes by 5% or less for the duration that a sample of interest is flowed through the flow stream, such as by 4% or less, such as by 3% or less, such as by 2% or less, such as by 1% or less, such as by 0.5% or less, such as by 0.1% or less, such as by 0.01% or less, such as by 0.001% or less and including a laser irradiation intensity that changes by 0.0001% or less. In certain embodiments, continuous irradiation of the flow stream includes irradiating the flow stream with a laser that exhibits no change in intensity for the duration that a sample is flowed through the flow stream. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In practicing the subject methods, the flow stream may be continuously irradiated with a laser such as a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In others instances, the laser configured for continuous irradiation is a dye laser, such as a stilbene, coumarin or rhodamine laser. In yet other instances, lasers configured for continuous irradiation of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO4 laser, $Nd:YCa_4O(BO_3)_3$ laser, Nd:YCOB laser, titanium sapphire laser, thulium YAG laser, ytterbium YAG laser, $ytterbium_2O_3$ laser or cerium doped lasers and combinations thereof. In still other instances, systems include a semiconductor diode laser, optically pumped semiconductor laser (OPSL), or a frequency doubled- or frequency tripled implementation of any of the above-mentioned lasers.

In embodiments, methods include irradiating the flow stream in discrete intervals with one or more lasers that are triggered when a particle is irradiated during continuous irradiation of the flow stream as described above. The term "discrete interval" is used herein in its conventional sense to refer to irradiating the flow stream for a predetermined duration of time followed by a period of time where the flow stream is not irradiated by the laser (e.g., by turning off the laser or by blocking the laser such as with a chopper, beam stop, etc.). In some embodiments, methods include irradiating the flow stream with one or more lasers in discrete intervals of 0.001 μs or more, such as for 0.005 μs or more, such as for 0.01 μs or more, such as for 0.05 μs or more, such as for 0.1 μs or more, such as for 0.5 μs or more, such as for 1 μs or more, such as for 5 μs or more, such as for 10 μs or more, such as for 50 μs or more, such as for 100 μs or more and including for 500 μs or more. In certain instances, methods include irradiating the flow stream with one or more lasers in discrete intervals of from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs. The duration between each discrete interval of irradiation by each laser may be 0.001 μs or more, such as 0.005 μs or more, such as 0.01 μs or more, such as 0.05 μs or more, such as 0.1 μs or more, such as 0.5 μs or more, such as 1 μs or more, such as 5 μs or more, such as 10 μs or more, such as 50 μs or more, such as 100 µs or more and including 500 µs or more. For example, the duration between each discrete interval of irradiation by each laser may range from 0.0001 µs to 500 ms, such as from 0.0005 µs to 250 ms, such as from 0.001 µs to 50 ms, such as from 0.005 µs to 5 ms, such as from 0.01 µs to 1000 µs, such as from 0.05 to 750 µs, such as from 0.1 µs to 500 µs, such as from 0.5 µs to 250 µs, such as from 1 µs to 100 µs and including from 10 µs to 100 µs.

In practicing the subject methods, the flow stream may be irradiated in discrete intervals with 1 laser or more configured for irradiating the flow stream in discrete intervals, such as 2 or more, such as 3 lasers or more, such as 4 lasers or more, such as 5 lasers or more, such as 10 lasers or more, such as 15 lasers or more, such as 25 lasers or more and including 50 lasers or more. Each of the lasers may be operationally coupled to one or more components to provide for intermittent irradiation with each laser. Any convenient protocol can be used to provide intermittent irradiation, such as an electronic switch for turning the laser on-and-off, such as a switch that is computer-controlled and triggered based on an data signal (e.g., received or inputted data signal) as described in greater detail below. In some embodiments, lasers are configured for irradiation in discrete intervals by intermittently exposing the laser beam of each laser to a beam chopper or beam stop.

In certain embodiments, methods include irradiating the flow stream in discrete intervals at positions on the flow stream that are downstream from the position of continuous laser irradiation. In one example, methods include continuously irradiating a position on a flow stream with a first laser configured for continuous irradiation of the flow stream; irradiating the flow stream with a second laser at a position downstream from the first laser; irradiating the flow stream with a third laser at a position downstream from the second laser; and irradiating the flow stream with a fourth laser at a position downstream from the third laser. Depending on the flow rate of the flow stream and the distance between the position of irradiation by each laser, methods may include independently irradiating the flow stream at a position that is 5 µm or more downstream from the position of irradiation by the first laser, such as 6 µm or more, such as 7 µm or more, such as 8 µm or more, such as 9 µm or more, such as 10 µm or more, such as 15 µm or more, such as 25 µm or more, such as 50 µm or more, such as 100 µm or more, such as 250 µm or more, such as 500 µm or more and including irradiating the flow stream in discrete intervals at a position that is 1000 µm or more downstream from the position of irradiation by the first laser. For instance, the position of irradiation of the flow stream by each laser may be downstream from the position of irradiation of the flow stream by the first laser by a distance of from 5 µm to 5000 µm, such as from 10 µm to 2500 µm, such as from 25 µm to 1000 µm, such as from 50 µm to 750 µm, such as from 75 µm to 500 µm and including from 100 µm to 250 µm.

The distance between irradiation on the flow stream by each of the lasers may vary, where the inter-irradiation space is independently 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such 8 µm or more, such as 9 µm or more and including 10 µm or more. In certain instances, methods include irradiating with the lasers positioned on the flow stream such that the lasers are immediately adjacent to each other (i.e., there is no inter-irradiation space).

In embodiments, lasers used to irradiate the flow stream in discrete intervals may each independently be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the laser configured for continuous irradiation is a dye laser, such as a stilbene, coumarin or rhodamine laser. In yet other instances, lasers configured for continuous irradiation of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO4 laser, $Nd:YCa_4O(BO_3)_3$ laser, Nd:YCOB laser, titanium sapphire laser, thulium YAG laser, ytterbium YAG laser, ytterbium$_2$O$_3$ laser or cerium doped lasers and combinations thereof. In still other instances, systems include a semiconductor diode laser, optically pumped semiconductor laser (OPSL), or a frequency doubled- or frequency tripled implementation of any of the above-mentioned lasers. The lasers may include any combination of types of lasers.

Depending on the desired wavelengths of light produced in the output laser beam (e.g., for use in irradiating a sample in a flow stream), each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser. In some embodiments, each of the lasers outputs a different wavelength of light. In certain instances, lasers of the systems are positioned such that each downstream laser outputs a longer wavelength of light. For example, where the method includes irradiating the flow stream with four lasers, the wavelength of light from the second laser is longer than the wavelength of light from the first laser, the wavelength of light from the third laser is longer than the wavelength of light from the second laser and the wavelength of light from the fourth laser is longer than the wavelength of light from the third laser.

The flow stream may be irradiated by each of the lasers from any suitable distance from, such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or. In addition, irradiation of the flow stream may be at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

In embodiments, irradiation of the particles in the flow stream in discrete intervals with the one or more lasers is triggered by the irradiation of a particle in the flow stream with the laser configured for continuous irradiation. In some embodiments, triggering irradiation by the laser includes turning the laser from an off setting to an on setting and irradiating the flow stream with the laser. In other embodiments, triggering irradiation by the laser includes moving a position or setting of an optical adjustment component such as a beam stopper to irradiate the flow stream with the laser.

Any convenient protocol can be used to trigger one or more of the lasers, such as by detecting a particle being irradiated by the first laser with a photodetector (i.e., passing through the continuous light beam of the first laser). In certain embodiments, systems include outputting a trigger signal from a trigger detector that is operably coupled to each of the lasers to initiate a discrete interval of irradiation.

In some embodiments, the duration between when a particle is detected as being irradiated by the continuously irradiating laser and initiation of a discrete interval of irradiation by one or more of the lasers may vary depending on the flow rate of the flow stream and the distance between the positions of irradiation on the flow stream. In some embodiments, the duration between irradiation by the continuously irradiating laser and the initiation of a discrete interval of laser irradiation may be 0.0001 μs or more, such as 0.0005 μs or more, such as 0.001 μs or more, such as 0.005 μs or more, such as 0.01 μs or more, such as 0.05 μs or more, such as 0.1 μs or more, such as 0.5 μs or more, such as 1 μs or more, such as 2 μs or more, such as 3 μs or more, such as 4 μs or more, such as 5 μs or more, such as 6 μs or more, such as 7 μs or more, such 8 μs or more, such as 9 μs or more and including 10 μs or more. In certain embodiments, systems are configured to delay initiation of a discrete interval in response to the output of the trigger signal, such as where the delay is 0.0001 μs or more, such as 0.0005 μs or more, such as 0.001 μs or more, such as 0.005 μs or more, such as 0.01 μs or more, such as 0.05 μs or more, such as 0.1 μs or more, such as 0.5 μs or more, such as 1 μs or more, such as 2 μs or more, such as 3 μs or more, such as 4 μs or more, such as 5 μs or more, such as 6 μs or more, such as 7 μs or more, such 8 μs or more, such as 9 μs or more and including 10 μs or more.

In some embodiments, methods include calculating the timing of initiating irradiation (i.e., when to start the discrete interval of irradiation) of the flow stream by each of the lasers. In some instances, to calculate the timing of irradiation, methods include continuously irradiating a particle flowing in the flow stream with all of the lasers of the light source, detecting light from the flow stream in response to irradiation of the particle with each of the lasers and calculating the time of irradiation of the particle by each of the lasers. In certain instances, calculating the time of initiating irradiation includes calculating a time interval between irradiation by each of the lasers.

Figure 3:
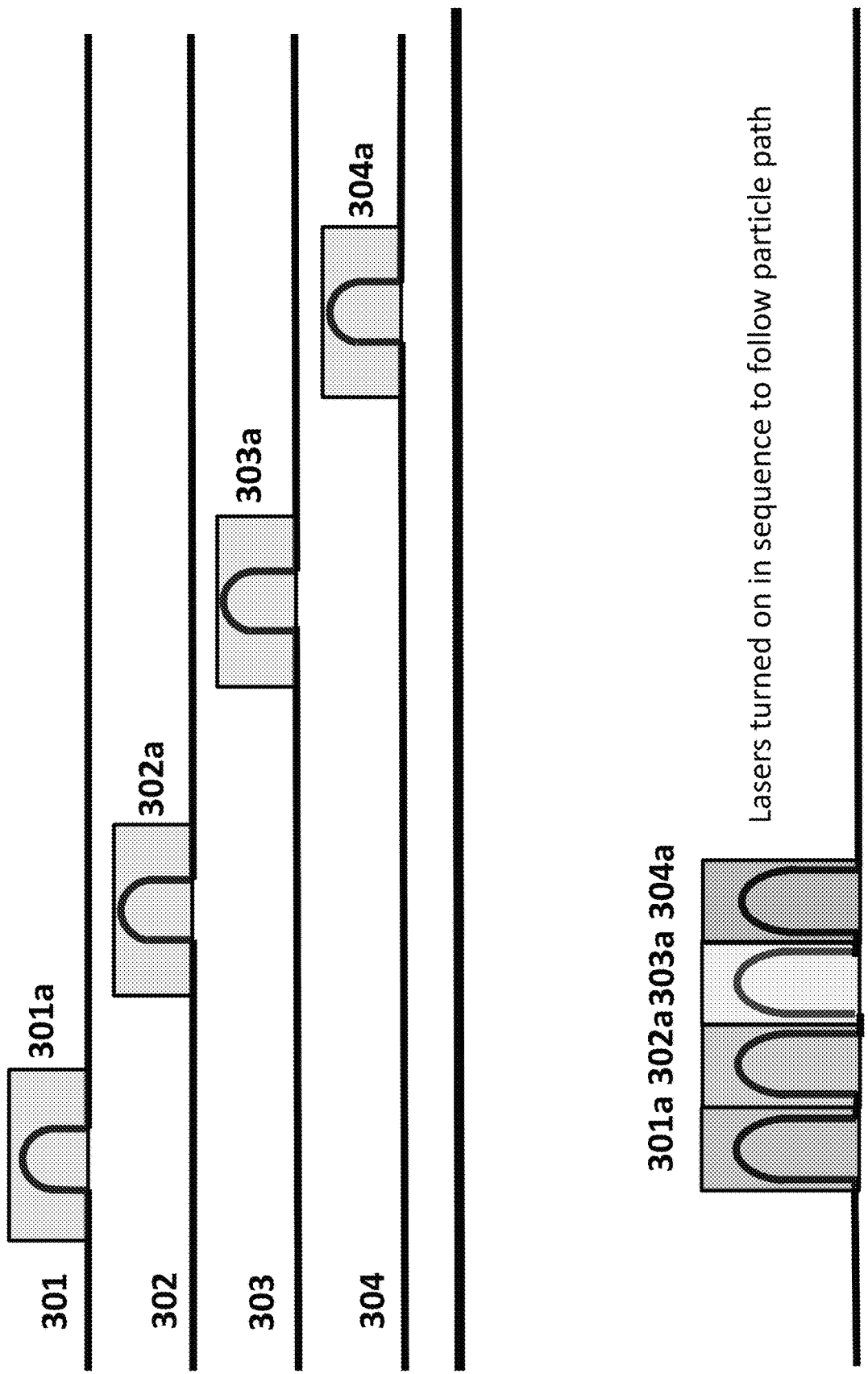
FIG. 3 depicts laser irradiation in discrete intervals by three lasers in response to a trigger signal from a continuously irradiating laser according to certain embodiments.

FIG. 3 depicts laser irradiation in discrete intervals by three lasers in response to a trigger signal from a continuously irradiating laser according to certain embodiments. The light source includes a laser 301 configured for continuous irradiation and lasers 302, 303 and 304 that are each positioned downstream from laser 301 along a flow stream and are configured for irradiation in discrete intervals. When laser 301 irradiates a particle at time window 301*a*, a trigger signal is output to lasers 302, 303 and 304 to irradiate the flow stream during time windows 302*a*, 303*a* and 304*a* during which the particle will cross the path of irradiation by lasers 302, 303 and 304. The lasers are configured to turn on in response to the trigger signal in sequence to follow the path of the particle in the flow stream.

In other embodiments, methods include calculating the duration of irradiation (i.e., the length of each discrete interval) of the flow stream by each of the lasers. In some instances, to calculate the duration of irradiation, methods include continuously irradiating a particle flowing in the flow stream with all of the lasers of the light source, detecting light from the flow stream in response to irradiation of the particle with each of the lasers and calculating the duration of the discrete intervals of irradiation by each laser. In these instances, the duration of each discrete interval may be calculated based on the position of irradiation on the flow stream and the flow rate of the particle in the flow stream.

In some embodiments, methods include turning on one or more downstream lasers in response to irradiation of a particle in the flow stream by the first laser. Depending on the distance between the first laser and the one or more downstream lasers, each laser may be independently turned on in response to irradiation by the first laser within 0.00001 μs or more, such as within 0.00005 μs or more, such as within 0.0001 μs or more, such as within 0.0005 μs or more, such as within 0.001 μs or more, such as within 0.005 μs or more, such as within 0.01 μs or more, such as within 0.05 μs or more, such as within 0.1 μs or more, such as within 0.5 μs or more and including within 1 μs or more. In certain instances, each laser configured to be independently turned on within from 0.00001 μs to 100 μs after irradiation of the particle by the first laser, such as from 0.00005 μs to 90 μs, such as from 0.0001 μs to 80 μs, such as from 0.0005 μs to 70 μs, such as from 0.001 μs to 60 μs, such as from 0.005 μs to 50 μs, such as from 0.01 μs to 40 μs, such as from 0.05 μs to 30 μs, such as from 0.1 μs to 20 μs and including from 1 μs to 10 μs.

In some embodiments, methods include moving a beam stop that is positioned in the beam path between one or more the downstream lasers and the flow stream in response to irradiation of the particle by the first laser. The beam stop may be moved by coupling the beam stop to a movable support stage or directly with a motor actuated translation stage, leadscrew translation assembly, geared translation device, such as those employing a stepper motor, servo motor, brushless electric motor, brushed DC motor, microstep drive motor, high resolution stepper motor, among other types of motors. The beam stop may be moved in response to irradiation by the first laser within 0.00001 μs or more, such as within 0.00005 μs or more, such as within 0.0001 μs or more, such as within 0.0005 μs or more, such as within 0.001 μs or more, such as within 0.005 μs or more, such as within 0.01 μs or more, such as within 0.05 μs or more, such as within 0.1 μs or more, such as within 0.5 μs or more and including within 1 μs or more. In certain instances, the beam stop is moved from the beam path of the one or more downstream lasers within from 0.00001 μs to 100 μs after irradiation of the particle by the first laser, such as from 0.00005 μs to 90 μs, such as from 0.0001 μs to 80 μs, such as from 0.0005 μs to 70 μs, such as from 0.001 μs to 60 μs, such as from 0.005 μs to 50 μs, such as from 0.01 μs to 40 μs, such as from 0.05 μs to 30 μs, such as from 0.1 μs to 20 μs and including from 1 μs to 10 μs.

In some embodiments, methods include directing light from one or more of the downstream lasers with a beam diverter to the flow stream in response to irradiation of a particle by the first laser. In some embodiments, a data signal is generated in response to irradiation of the particle in the flow stream by the first laser and light from the one or more downstream lasers is re-directed to the flow stream by the beam diverter in response to the generated data signal. In some instances, the beam diverter is an acousto-optical device such as an acousto-optical deflector (AOD) or an acousto-optical modulator (AOM). In these embodiments, the data signal may include changing drive signals from a direct digital synthesizer (DDS), arbitrary waveform generator (AWG), or electrical pulse generator in a manner sufficient to re-direct light from the laser to the flow stream. In other instances, the beam diverter is an electro-optical device such as an electro-optical deflector (EOD) or an electro-optical modulator (EOM). In these embodiments, the data signal may include changing an inputted current or applying a voltage to the electro-optical device in a manner sufficient to re-direct light from the laser to the flow stream. In some embodiments, the beam diverter is configured to re-direct the beam path of the one or more downstream lasers in response to irradiation by the first laser within 0.00001 µs or more, such as within 0.00005 µs or more, such as within 0.0001 µs or more, such as within 0.0005 µs or more, such as within 0.001 µs or more, such as within 0.005 µs or more, such as within 0.01 µs or more, such as within 0.05 µs or more, such as within 0.1 µs or more, such as within 0.5 µs or more and including within 1 µs or more. In certain instances, the beam diverter is configured to re-direct the beam path of the one or more downstream lasers within from 0.00001 µs to 100 µs after irradiation of the particle by the first laser, such as from 0.00005 µs to 90 µs, such as from 0.0001 µs to 80 µs, such as from 0.0005 µs to 70 µs, such as from 0.001 µs to 60 µs, such as from 0.005 µs to 50 µs, such as from 0.01 µs to 40 µs, such as from 0.05 µs to 30 µs, such as from 0.1 µs to 20 µs and including from 1 µs to 10 µs.

Methods of the present disclosure, according to certain embodiments, also include detecting light from particles in the stream. In embodiments, light from the flow stream is conveyed to and detected with a light detection system having one or more photodetectors. Photodetectors for practicing the subject methods may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. Light from particles in the flow stream may be detected using 1 photodetector or more, such as 2 photodetectors or more, such as 3 photodetectors or more, such as 4 photodetectors or more, such as 5 photodetectors or more, such as 10 photodetectors or more, such as 25 photodetectors or more and including 50 photodetectors or more.

In certain embodiments, light from particles in the flow stream is detected with a photodiode array having more than one photodiode, such as two or more photodiodes, such as three or more, such as five or more and including 10 or more photodiodes, where each photodiode may have an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, light from the particles in the flow stream may be measured at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths.

In embodiments, light may be measured by the photodetectors continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Light from the flow stream may be measure with each photodetector at any suitable distance from the flow stream so long as a usable light signal is detectable. For example, detectors may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, methods may include detecting forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light.

In certain embodiments, methods include detecting light from each of the lasers with a single photodetector. In these embodiments, the photodetector detects light from particles in the flow stream that are irradiated with the laser configured for continuous irradiation and each laser that is configured for irradiation in discrete intervals.

In some embodiments, methods include detecting light from the flow stream that is conveyed through an optical adjustment component that is configured to reduce the amount of light that is conveyed from the laser configured for continuous irradiation to the one or more photodetectors. In these embodiments, the optical adjustment component is configured to restrict, reduce or limit the propagation of at least one or more wavelengths of the light (e.g., one or more of the wavelengths of the light of the laser that is configured for continuous irradiation) from the sample to the active surface of the photodetector. The light conveyed to the photodetector may include an optical component that limits the propagation of one or more different wavelengths of light, such as 5 or more, such as 10 or more, such as 25 or more, such as 50 or more, such as 100 or more, such as 200 or more, such as 300 or more and including limiting the propagation of 500 or more different wavelengths of light. For example, in some embodiments, the optical adjustment component is a bandpass filter, such as a long pass filter which conveys a spectral range of light that is longer than the irradiating wavelength of the first laser. In other embodiments, the optical adjustment component is a dichroic mirror, such as a dichroic mirror which conveys a spectral range of light that is longer than the irradiating wavelength of the first laser and reflects a spectral range of light that includes the irradiating wavelength of the first laser.

In some embodiments, methods include collecting and directing light from the flow stream to the photodetectors with an optical collection system. In some embodiments, light is conveyed from the flow stream to the photodetectors with fiber optics. In some instances, the optical collection system may be a fiber optics light relay bundle and light is conveyed through the fiber optics light relay bundle to the photodetectors. In certain embodiments, the optical collection unit is a single fiber optic that is configured to covey light from irradiation by each of the lasers to a single photodetector in the light detection system. In these embodiments, methods include irradiating the flow stream with the lasers at positions that spanning a length that is equal to or less than the diameter of the single fiber optic configured to collect light from the flow stream. For example, methods may include irradiating positions on the flow stream that span 100 μm or less, such as 90 μm or less, such as 80 μm or less, such as 70 μm or less, such as 60 μm or less and including 50 μm or less and the single fiber optic may have a diameter which is sufficient to collect light from each of the positions irradiated by the lasers, such as a diameter of 50 μm or more, such as 60 μm or more, such as 70 μm or more, such as 80 μm or more, such as 90 μm or more and including where the single fiber optic configured to collect light from the irradiated flow stream is 100 μm or more.

In other embodiments, light from the flow stream is conveyed to the photodetectors using a free-space light relay system. For instance, the free-space light relay system may include a housing having a proximal end and a distal end, the proximal end being coupled to the light detection system. The free-space relay system may include any combination of different optical components, such as one or more lenses, mirrors, slits, pinholes, wavelength separators, or a combination thereof.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

In some embodiments, computer readable storage media of interest include a computer program stored thereon, where the computer program when loaded on the computer includes instructions having: algorithm for continuously irradiating a flow stream with a first laser, algorithm for irradiating the flow stream in discrete intervals with a second laser, where each discrete interval for irradiation by the second laser is triggered by irradiation of a particle in the flow stream with the first laser, algorithm for detecting light from particles in the flow stream irradiated by each of the lasers with a single photodetector coupled to a single fiber optic and algorithm for calculating a timing of irradiation of the flow stream by each of the lasers. In some embodiments, the non-transitory computer readable storage medium includes instructions having algorithm for continuously irradiating a flow stream with a first laser; and algorithm for irradiating the flow stream in discrete intervals with a plurality of lasers, where each discrete interval for irradiation by the each of the plurality of lasers is triggered by irradiation of a particle in the flow stream with the first laser. In some instances, the non-transitory computer readable storage medium includes instructions having algorithm for continuously irradiating a particle in the flow stream with each of the lasers, algorithm for detecting light from the flow stream in response to irradiation of the particle with each of the lasers and algorithm for calculating a time interval between irradiation of the particle by each of the lasers.

In some embodiments, the non-transitory computer readable storage medium includes instructions having algorithm for turning on the second laser in response to irradiation of a particle by the first laser. In some embodiments, the non-transitory computer readable storage medium includes instructions having algorithm for moving a beam stop positioned in the beam path between the second laser and the flow stream in response to irradiation of a particle by the first laser. In some embodiments, the non-transitory computer readable storage medium includes instructions having algorithm for directing light from the second laser to the flow stream with a beam diverter in response to irradiation of a particle by the first laser.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Kits including one or more components of the subject systems are also provided. Kits according to certain embodiments include one or more lasers, such as a laser that is configured for continuous irradiation and a laser that is configured for irradiation in discrete intervals. In some embodiments, kits may include a switch for operating one or more of the lasers in discrete intervals (e.g., pulsing the laser). Kits may also include an optical adjustment component that is configured to reduce the passage of the wavelength of light of one or more of the lasers. In some instances, the optical adjustment component is a bandpass filter, such as a long pass filter which conveys a spectral range of light that is longer than the irradiating wavelength of one or more of the lasers. In other instances, the optical adjustment component is a dichroic mirror, such as a dichroic mirror which conveys a spectral range of light that is longer than the irradiating wavelength of one or more of the lasers and reflects a spectral range of light that includes the wavelength of one or more of the lasers.

Kits may also include a photodetector array for detecting light from the flow stream. In certain embodiments, the support stage includes a motor, such as a step motor. The subject kits may also include optical relay systems for propagating light from the sample in the flow stream to the detector, such fiber optics (e.g., a single fiber optic).

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system comprising:
   a first laser configured for continuous irradiation of a flow stream; and
   a second laser configured for irradiation of the flow stream in discrete intervals,
   wherein each discrete interval of irradiation by the second laser is triggered by irradiation of a particle in the flow stream with the first laser, and the system comprises:
   a beam stop configured to be moved in response to irradiation of the particle by the first laser; or a beam diverter configured to direct light to the flow stream in response to irradiation of the particle by the first laser.

2. A system comprising:
a light source comprising:
a first laser configured for continuous irradiation of a flow stream;
a second laser configured for irradiation of the flow stream in discrete intervals, wherein each discrete interval of irradiation by the second laser is triggered by irradiation of a particle in the flow stream with the first laser;
a light detection system comprising:
a single fiber optic configured to collect light from particles in the flow stream irradiated by each of the lasers; and
a single photodetector configured to detect light conveyed by the single fiber optic; and
a processor comprising memory operably coupled to the processor wherein the memory comprises instructions stored thereon, which when executed by the processor, cause the processor to calculate timing of irradiation of the flow stream by each of the lasers;
wherein the system comprises:
a beam stop configured to be moved in response to irradiation of the particle by the first laser; or
a beam diverter configured to direct light to the flow stream in response to irradiation of the particle by the first laser.

3. The system according to claim 2, wherein the second laser is configured to irradiate the flow stream at a position downstream from the first laser.

4. The system according to claim 2, wherein the wavelength of light from the first laser is shorter than light from the second laser.

5. The system according to claim 2, wherein the system comprises:
the first laser configured for continuous irradiation of the flow stream; and
a plurality of lasers configured for irradiation of the flow stream in discrete intervals.

6. The system according to claim 5, wherein the plurality of lasers are configured to irradiate the flow stream at positions downstream from the first laser.

7. The system according to claim 6, wherein the plurality of lasers are configured to irradiate the flow stream at positions that are spaced apart from each other by 10 μm or less.

8. The system according to claim 5, wherein each of the plurality of lasers outputs a different wavelength of light.

9. The system according to claim 5, wherein each discrete interval of irradiation of the flow stream by each of the plurality of lasers is independently triggered by irradiation of the particle in the flow stream with the first laser.

10. The system according to claim 2, wherein each discrete interval for each laser comprises a duration of from 1 μs to 500 μs.

11. The system according to claim 2, wherein the memory comprises instructions stored thereon, which when executed by the processor, cause the processor to calculate timing of irradiation of the flow stream by each of the lasers by:
irradiating the particle in the flow stream with each of the lasers;
detecting light from the flow stream in response to irradiation of the particle with each of the lasers; and
calculating a time interval between irradiation of the particle by each of the lasers.

12. The system according to claim 2, wherein the system is configured to turn on the second laser in response to irradiation of the particle by the first laser.

13. The system according to claim 2, wherein:
the system comprises the beam stop; and
the beam stop is positioned in the beam path between the second laser and the flow stream.

14. The system according to claim 13, wherein the memory of the processor comprises instructions stored thereon, which when executed by the processor, cause the processor to move the beam stop from the beam path between the second laser and the flow stream in response to irradiation of the particle by the first laser.

15. The system according to claim 2, wherein:
the system comprises the beam diverter; and
the beam diverter is positioned in the beam path between the second laser and the flow stream, wherein the beam diverter is configured to divert light from the second laser away from the flow stream.

16. The system according to claim 15, wherein the beam diverter is configured to direct light from the second laser to the flow stream in response to irradiation of the particle by the first laser.

17. The system according to claim 15, wherein the beam diverter comprises an acousto-optical device.

18. The system according to claim 2, wherein the light detection system comprises: an optical adjustment component configured to reduce an amount of light that is conveyed from the first laser to the photodetector.

19. The system according to claim 18, wherein the optical adjustment component is a bandpass filter.

20. The system according to claim 2, wherein the single photodetector is a photodetector array.

* * * * *